US008501873B2

(12) United States Patent
Sasabe et al.

(10) Patent No.: US 8,501,873 B2
(45) Date of Patent: Aug. 6, 2013

(54) WATER ABSORBENT MATERIAL, METHOD FOR PRODUCTION OF SURFACE CROSS-LINKED WATER ABSORBENT RESIN, AND METHOD FOR EVALUATION OF WATER ABSORBENT MATERIAL

(75) Inventors: Masazumi Sasabe, Kakogawa (JP); Kenji Kadonaga, Kakogawa (JP); Shigeru Sakamoto, Himeji (JP); Motohiro Imura, Shiki-gun (JP); Tsunemasa Ueno, Ikeda (JP); Hiroko Ueda, Himeji (JP); Yoshifumi Adachi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 602 days.

(21) Appl. No.: 11/660,758

(22) PCT Filed: Aug. 31, 2005

(86) PCT No.: PCT/JP2005/016360
§ 371 (c)(1),
(2), (4) Date: Feb. 22, 2007

(87) PCT Pub. No.: WO2006/025586
PCT Pub. Date: Mar. 9, 2006

(65) Prior Publication Data
US 2007/0264489 A1 Nov. 15, 2007

(30) Foreign Application Priority Data
Sep. 2, 2004 (JP) ................ 2004-256059

(51) Int. Cl.
*C08F 8/42* (2006.01)
*C08F 8/12* (2006.01)
*C08F 6/02* (2006.01)

(52) U.S. Cl.
USPC ........ 525/384; 428/327; 428/402; 525/329.7; 525/330.1; 525/383; 525/359.5; 526/317.1

(58) Field of Classification Search
USPC ........ 428/327, 402; 327/459, 464; 525/329.7, 525/330.1, 383, 384, 359.5; 526/317.1
See application file for complete search history.

(56) References Cited

U.S. PATENT DOCUMENTS
4,507,438 A 3/1985 Obayashi et al.
4,541,871 A 9/1985 Obayashi et al.
(Continued)

FOREIGN PATENT DOCUMENTS
EP 1 516 884 A2 3/2005
GB 2 267 094 A 11/1993
(Continued)

OTHER PUBLICATIONS
PCT/IB/326 for PCT/JP/2005/016360.
(Continued)

*Primary Examiner* — Robert C Boyle
(74) *Attorney, Agent, or Firm* — Buchanan Ingersoll & Rooney PC

(57) ABSTRACT

A homogeneously surface cross-linked water absorbent resin and a method for the production thereof are provided.
The water absorbent material is formed of a surface cross-linked water absorbent resin resulting from granular irregularly pulverized shaped surface cross-linking the product of partial neutralization or whole neutralization of a water absorbent resin having acrylic acid or a metal salt thereof as a main component, which water absorbent material shows a metal atom concentration on the surface of the water absorbent material in the range of 0-10% within 0 second of polishing and 2-35% at 10 seconds value of polishing as determined by subjecting the water absorbent material to Ar ion discharge polishing under a voltage of 500 Å. The surface cross-linked water absorbent resin to be used herein can be produced by surface cross-linking a water absorbent resin having a specific particle diameter with a surface cross-linking agent having a water concentration in a specific range.

12 Claims, 2 Drawing Sheets

U.S. PATENT DOCUMENTS

| | | | |
|---|---|---|---|
| 4,973,632 | A | 11/1990 | Nagasuna et al. |
| 5,026,800 | A | 6/1991 | Kimura et al. |
| 5,244,735 | A | 9/1993 | Kimura et al. |
| 5,422,405 | A | 6/1995 | Dairoku et al. |
| 5,610,208 | A * | 3/1997 | Dairoku et al. ............... 525/384 |
| 6,087,002 | A | 7/2000 | Kimura et al. |
| 6,107,358 | A * | 8/2000 | Harada et al. ................. 521/133 |
| 2003/0008946 | A1 * | 1/2003 | Dairoku et al. ............... 523/201 |

FOREIGN PATENT DOCUMENTS

| | | |
|---|---|---|
| JP | 06-184320 A | 7/1994 |
| JP | 07-278225 A | 10/1995 |
| JP | 07-310021 A | 11/1995 |
| JP | 2001-192464 A | 7/2001 |
| WO | 2004/069915 * | 8/2004 |
| WO | WO 2004/069293 A1 | 8/2004 |

OTHER PUBLICATIONS

PCT/IB/373 for PCT/JP/2005/016360 dated Mar. 6, 2007.

European Search Report dated Nov. 4, 2008, issued in European Application No. 05 782 161.3-2102.

International Search Report for PCT/JP2005/016360.

Chinese Office Action issued Jun. 19, 2009, in corresponding Chinese Patent Application No. 2005800295505, with English language translation.

Korean Office Action dated Nov. 28, 2008, in corresponding Korean Patent Application No. 10-2007-7005016, with English language translation.

Chinese Office Action issued Dec. 31, 2010, in corresponding Chinese Patent Application No. 200580029550.5, with English language translation.

Chinese Office Action issued Sep. 20, 2010, in corresponding Chinese Patent Application No. 200580029550.5, with English language translation.

Chinese Office Action dated Apr. 19, 2010, and issued in Application No. 200580029550.5, and English translation thereof.

Communication pursuant to Article 94(3) EPC issued on Sep. 16, 2011 by the European Patent Office in corresponding European Patent Application No. 05 782 161.3.

Official Action issued on Aug. 30, 2011 by the Taiwan Patent Office in corresponding Taiwanese Patent Application No. 094130203, and an English language translation of the Official Action.

Office Action (Notification of Reasons for Rejection) issued by the Japanese Patent Office issued in corresponding Japanese Patent Application No. 2007-511110 dated Nov. 1, 2011, with an English translation thereof.

Office Action (Decision of Examination) issued by the Taiwanese Patent Office in corresponding Taiwanese Patent Application No. 094130203 on Feb. 29, 2012, with an English translation thereof.

* cited by examiner

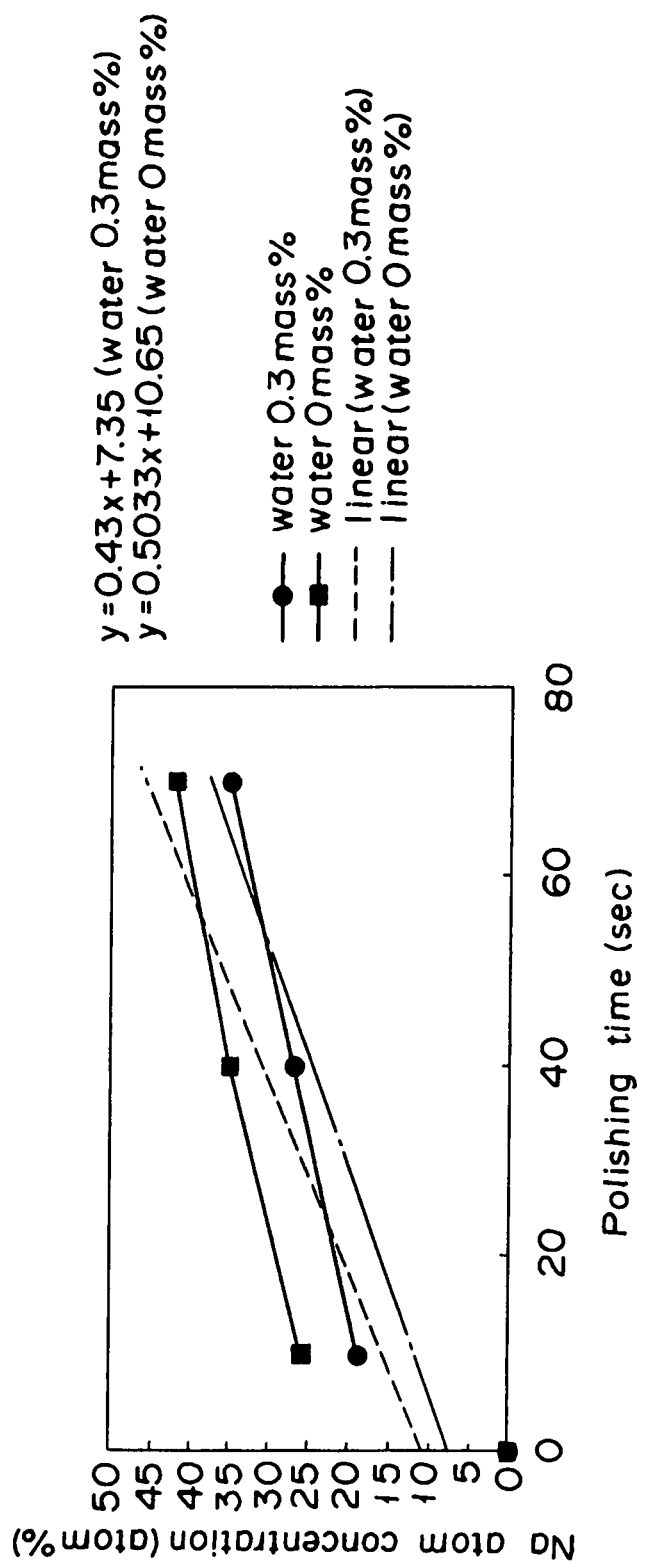

WATER ABSORBENT MATERIAL, METHOD FOR PRODUCTION OF SURFACE CROSS-LINKED WATER ABSORBENT RESIN, AND METHOD FOR EVALUATION OF WATER ABSORBENT MATERIAL

TECHNICAL FIELD

This invention relates to a water absorbable material. More particularly, this invention relates to a water absorbable material formed of a surface cross-linked water absorbable resin comprising a surface cross-linked layer of uniform surface having an average particle diameter in a specific range and a narrow particle-size distribution, possessing prescribed surface hardness, and excelling in absorption properties and handling property, a method for the production of the irregularly pulverized shaped surface cross-linked water absorbent resin, and a method for the evaluation of a water absorbent material.

BACKGROUND ART

In recent years, the water absorbent resin has been extensively utilized as one of the component materials of such sanitary materials as disposable diapers and sanitary napkins with the object of absorbing body liquid. As the characteristic properties which the water absorbent-resin is expected to possess, the following three characteristic properties may be cited.

(1) Excellent absorption properties, namely a high capacity of water absorption, a high coefficient of water absorption under load, a high speed of absorption, and a high capacity of absorbing an aqueous liquid from a medium containing the aqueous liquid to be exhibited by the water absorbent resin when the resin is exposed to an aqueous liquid.

(2) Broad variety of objects at which the intended absorption is aimed. That is, the water absorbent resin manifests high affinity for not only water and urine but also such humors as blood and menses.

(3) Excellent handling properties manifested by the resin. That is, low hygroscopicity and high fluidity at elevated humidity, a small content of fine particles (less than 106 μm, for example), and low dusting characteristics.

Regarding the absorption properties, however, the individual properties mentioned in (1) above do not necessarily show a positive correlation. The solid state properties such as absorption velocity and gel strength are inevitably lowered in accordance as the speed of water absorption is increased, for example. The liquid permeability is increased but the absorption velocity is inevitably lowered in accordance as the average particle diameter of the water absorbent resin is increased.

As a means to modify the water absorption properties of the water absorbent resin in good balance, the technique of cross-linking the neighborhood of the surface of the water absorbent resin has been known. Various methods for embodying this technique have been proposed. For example, a method which cross-links 100 mass parts of a water absorbent resin with 0.2-20 mass parts of an inert solvent such as a polyhydric alcohol compound as a cross-linking agent and 0.005-5.0 mass parts of one compound selected from the group consisting of glycidyl ether compounds, haloepoxy compounds, aldehyde compounds, and isocyanate compounds in the presence of 0.01-1.3 mass parts of water based on 1 mass part of the water absorbent resin prior to a surface cross-linking treatment at a temperature in the range of 400-150° C. has been disclosed (U.S. Pat. No. 4,507,438 and U.S. Pat. No. 4,541,871). Since an increase in cross-linking density results in heightening speed of absorption but lowering water absorption power, this method is aimed at obtaining a water absorbent resin having excellent dispersibility in water and a high absorption velocity by causing a water absorbent resin swelled with a specific amount of water to be dispersed in an inert solvent and allowing a cross-linking agent to react on the resin.

Then, for the purpose of obtaining a water absorbent resin excelling in coefficient of water absorption under no load and in coefficient of water absorption under load as well, a method which produces an irregularly pulverized water absorbent resin by subjecting 100 mass parts of a water absorbent resin, 0.1-5 mass parts of a first cross-linking agent having an SP value of not less than 12.5 (cal/cm$^3$) 0.005-0.5 mass parts of a second cross-linking agent having an SP value of not more than 12.5, and not more than 20 mass parts of water to a heat treatment at a temperature of not less than 160° C. has been disclosed (U.S. Pat. No. 5,422,405). As typical examples of the first cross-linking agent, ethylene glycol and propylene glycol are cited. As typical examples of the second cross-linking agent, diethylene glycol, 1,3-butane diol, polyethylene glycol diglycidyl ether, ethylene diamine, 2,4-trilene diisocyanate, and epichlorohydrin are cited. In a working example, the cross-linking agents are caused to react on 100 mass parts of the water absorbent resin in the presence of 3-5 mass parts of water. Incidentally, the average particle diameter of the water absorbent resin to be used is most preferably in the range of 300-600 μm.

A highly absorbent polymer which has an equilibrium swell rate of absorption of not less than 40 g/g of physiological saline water and a time of not more than 40 seconds for passage of 5 ml of physiological saline water as determined by a prescribed method has been also known (GB-B-2,267,094). The polymer is obtained by heightening the cross-linking density of the surface of a water-insoluble hydrophilic cross-linked polymer possessing a carboxyl group or a carboxylate group. In a working examples cited therein, a water-insoluble hydrophilic cross-linked polymer possessing a carboxyl group or a carboxylate group is made to add 2,500 ppm of a surface cross-linking agent under the condition of containing water at a concentration in the range of 20-35 mass % to effect addition to the cross-linking density of the surface of the particles of this cross-linked polymer.

Further, as a water absorbent resin suitable for sanitary materials having a high resin concentration, a water absorbent resin which has the thickness of the surface cross-linked layer thereof decreased to the order of submicrons and has the ratio, mass %, of the surface cross-linked layer to the whole water absorbent resin controlled in a specific range has been disclosed (JP-A-2001-192,464). Since an undue increase in the surface cross-linked layer results in obstructing the water absorption power of the water absorbent resin and inflicting a crack in the surface cross-linked layer during or after the course of swelling, the thickness of the surface cross-linked layer is required to be not less than 50 nm and the ratio of the surface cross-linked layer is restricted to a range of 0.3-3 mass %. The water absorbent resin of this quality is obtained preferably by using a polyhydric alcohol as a surface cross-linking agent and controlling the temperature of the water absorbent resin in a range of 5°-20° C. and/or fixing the temperature of the surface cross-linking agent-containing liquid in the range of 0°-20° C. In a working example, the surface cross-linking treatment is carried out in the presence of 2-4 mass parts of water based on 100 mass parts of the water absorbent resin which has not undergone the surface cross-linking treatment.

Meanwhile, a method which promotes uniform dispersion of a surface cross-linking agent on the surface of a water absorbent resin and proper permeation thereof in the neighborhood of the surface, prevents the adjacent particles from coalescing, and accomplishes uniform surface cross-linkage by adjusting the average particle diameter of the water absorbent resin in the range of 100-600 μm and the logarithmic standard deviation δζ below 0.35 has been disclosed (U.S. Pat. No. 4,973,632, U.S. Pat. No. 5,026,800, U.S. Pat. No. 5,244,735, and U.S. Pat. No. 6,087,002). The water absorbent resin which has not undergone the surface cross-linking treatment is obtained by using the aqueous solution of a water-soluble ethylenically unsaturated monomer having a viscosity of not less than 15 cps as determined preferably with a Brookfield rotational viscosimeter under the conditions of 25° C. and 0.6 rpm and using a sucrose fatty acid ester and/or a polyglycerin fatty acid ester as a dispersant, dispersing and suspending them in a hydrophobic organic solvent inert to polymerization, and setting the monomer polymerizing with a radical polymerization initiator. Then, the surface cross-linked water absorbent resin is obtained by mixing a water absorbent resin powder dried to a water content of less than 10% with 0.005-20 mass % of a surface cross-linking agent, 0.1-5 mass % of water, and 0.01-6 mass % of a hydrophilic organic solvent and subsequently subjecting the resultant mixture to a thermal reaction.

The surface cross-linked water absorbent resins which are obtained by the heretofore well known surface cross-linking techniques enumerated above indeed bring an effect of exalting the coefficient of water absorption under load and the absorption velocity described in (1) above. They, however, entail the problem that the coefficient of water absorption determined under load is vastly lowered. Further, they tend either to induce absolutely no improvement of the affinity for blood described in (2) and the hygroscopicity at elevated temperatures described in (3) above or to rather aggravate them.

While the affinity for blood and the hygroscopicity at elevated temperatures are thought to depend on the characteristic properties of the surface of the water absorbent resin, the reports published to date have paid no attention whatever to such surface properties and have been substantially wholly directed toward solely evaluating the absorption properties. They have made virtually no effort to express the homogeneity of heterogeneity of the cross-linkage resulting from the surface cross-linking treatment or the difference of the chemical properties of surface. The desirability of developing a technique for clarifying conveniently and distinctly the homogeneity and heterogeneity of the cross-linkage and the difference of chemical properties of surface has been finding growing recognition.

Further, in consequence of the recent years' advance of the absorbent products toward decreased thicknesses and of the development of processing techniques directed toward the decreased thicknesses, the desirability of developing a water absorbent resin which has a high coefficient of water absorption, a small average particle diameter, and a high absorption velocity, and also has a high total absorption capacity has been finding recognition. When the conventional methods are adopted for the production of a water absorbent resin having such a high coefficient of water absorption and such a small average particle diameter as mentioned above, the high absorption velocity of the water absorbent resin has prevented the aqueous solution of a surface cross-linking agent from being uniformly applied to the surface of the water absorbent resin particles and the surface cross-linking treatment from being carried out uniformly.

Thus, this invention has for an object thereof the provision of an excellent water absorbent material which retains a high coefficient of water absorption and a high absorption velocity and manifests a high total absorption capacity as well and a method for the production thereof.

It has another object of providing a water absorbent material which is formed of a surface cross-linked water absorbent resin possessing affinity for blood and menses and exhibiting an excellent handling property and a method for the production of such a surface cross-linked water absorbable resin as mentioned above.

It has still another object of providing a method for convenient and distinct evaluation of the surface properties (cross-linking property and chemical property) of the absorbent material.

DISCLOSURE OF THE INVENTION

We have made a detailed study of the conventional surface cross-linked water absorbent resin obtained by surface cross-linking the partly neutralized or wholly neutralized product of a water absorbent resin having acrylic acid or a metal salt thereof as a main component, particularly the finely divided surface cross-linked water absorbent resin having a weight average particle diameter in the range of 200-300 μm, by examining the cross-linked surface thereof in accordance with the method of X-ray photoelectron spectroscopy (ESCA or XPS) to find that even the surface cross-linked water absorbent resin allows a carboxyl group (—COOH) or a carboxyl salt which is the product of neutralization thereof (—COOM: M is a metal atom) to be detected on the surface of the water absorbent resin. They have further found that when the surface cross-linked water absorbent resin mentioned above is subjected to the Ar ion discharge polishing and assayed along the course of time by the method of X-ray photoelectron spectroscopy to determine the metal atom concentration, the metal atom concentration in the water absorbent resin particles continues to vary along the course of time and eventually converges to the same metal concentration as in the water absorbent resin which has not been given any surface cross-linking treatment. This fact indicates that the hardness and the thickness of the surface cross-linked layer resulting from the surface cross-linking treatment can be estimated by the method of determination mentioned above.

We have formed on the basis of the knowledge acquired as described above a hypothesis that the carboxyl group or the carboxyl salt remaining on the surface of the surface cross-linked water absorbent resin deteriorates the affinity for blood and menses and induces hydroscopicity at elevated temperatures and then proceeded to compare the metal atom concentration on the surface of the surface cross-linked water absorbent resin with the water absorbable property and the hygroscopicity to find that when the surface cross-linked water absorbent resin is obtained by surface cross-linking the product of partial neutralization or whole neutralization of a water absorbent resin having acrylic acid or a metal salt thereof as a main component and the metal atom concentration on the surface of the resin as determined while the resin is being subjected to the Ar ion discharge polishing under a voltage of 500 V is in the range of 0-10% at 0 second value of the polishing and is 2-35% at 10 seconds value of the polishing, the resin continues to manifest a high coefficient of water absorption, a high absorption velocity, and a high total absorption capacity and brings an effect of dramatically exalting the affinity for blood and dramatically lower the hygroscopicity at elevated humidity. The surface cross-linked water absorbent resin of this quality can be used as a water absorbent material.

As one example of means for obtaining a surface cross-linked water absorbent resin having a carboxyl group or a carboxyl salt remaining on the surface or a metal atom remaining on the surface thereof at a low concentration, we have discovered a method for the production of a surface cross-linked water absorbent resin, comprising a step of mixing the product of partial neutralization or whole neutralization of a water absorbent resin having a weight average particle diameter in the range of 200-300 μm and having acrylic acid or a metal salt thereof as a main component with a solution of a surface cross-linking agent containing a) 0.1-1 mass part of a first cross-linking agent which is a compound having a solubility parameter (SP value) of not less than 11.5 $(cal/cm^3)^{1/2}$ [$2.35 \times 10^4$ $(J/m^3)^{1/2}$] and possessing an ability to react with the carboxyl group possessed by the water absorbent resin, b) 0.015-0.5 mass part of a second cross-linking agent which is a compound having a solubility parameter (SP value) of less than 11.5 $(cal/cm^3)^{1/2}$ [$2.35 \times 10^4$ $(J/m^3)^{1/2}$] and possessing an ability to react with the carboxyl group possessed by the water absorbent resin, and c) 0-2 mass parts of water based on 100 mass parts of the solid component of the resin. This invention has been perfected as a result.

The water absorbent material of this invention possesses a homogeneous surface cross-linked layer and prescribed hardness in spite of a very small weight average particle diameter of 200-300 μm. Thus, it excels in such absorption properties as coefficient of water absorption, coefficient of blood absorption, and absorption velocity and in such handling properties as low hygroscopicity. The water absorbent material excels in performance because of a high rate of absorption. Particularly, it is capable of quickly absorbent an aqueous liquid and maintaining a high capacity for liquid diffusion. Further, the surface cross-linked water absorbent resin which forms the water absorbent material mentioned above can be conveniently manufactured by using a surface cross-linking agent-containing solution having a specific composition.

BRIEF DESCRIPTION OF THE DRAWINGS

FIG. 2 is a diagram showing metal atom concentrations (Na concentration) obtained by Ar ion discharge polishing in the water absorbent material formed of a surface cross-linked water absorbent resin prepared by adding 0.3 mass % of water during the course of surface cross-linking and the water absorbent material formed of a surface cross-linked water absorbent resin prepared without addition of water.

BEST MODE FOR CARRYING OUT THE INVENTION

Figure 1:
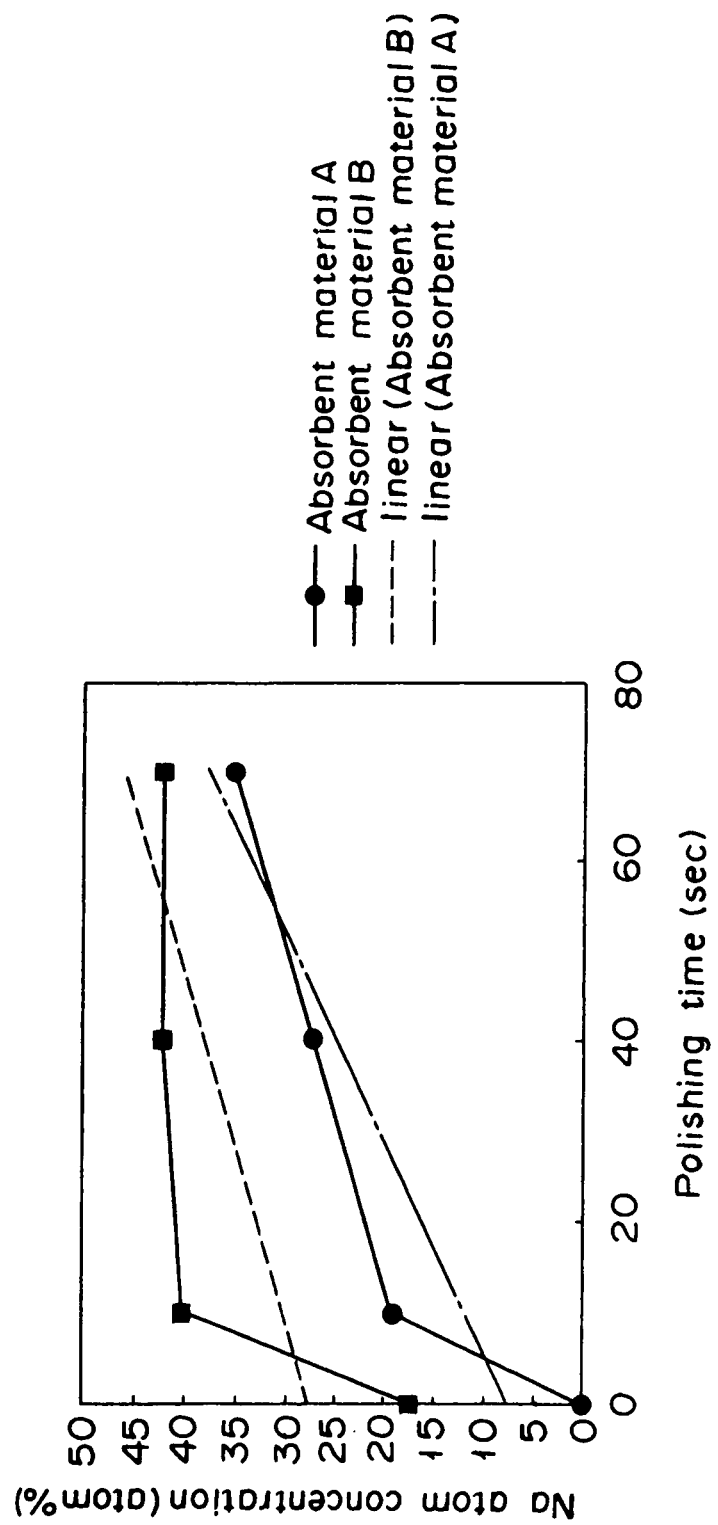
FIG. 1 is a diagram showing metal atom concentrations (Na concentration) in the water absorbent material A and the water absorbent material B resulting from Ar ion discharge polishing.

The first aspect of this invention is directed toward a water absorbent material formed of a surface cross-linked water absorbent resin resulting from granular irregularly pulverized shaped particles of partial or whole neutralization of a water absorbent resin having acrylic acid or a metal salt thereof as a main component, the metal atom concentration on the surface thereof determined by Ar ion discharge polishing under a voltage of 500 V falling in the range of 0-10% at 0 second value of the polishing and below 35% at 10 seconds value of the polishing.

The product of partial neutralization or whole neutralization of a water absorbent resin having acrylic acid or a metal salt as a main component contains throughout the whole body of resin the carboxyl salt (—COOM: M is a metal atom) resulting from the neutralization of the carboxyl group (—COOH) with an alkaline substance proportionately to the degree of neutralization. When the water absorbent resin of this quality is subjected to surface cross-linkage by using a cross-linking agent capable of reacting with the carboxyl group of a polyvalent alcohol or a polyvalent glycidyl compound and causing this cross-linking agent to react with the carboxyl group or carboxyl salt present in the surface layer of the resin, the surface cross-linkage produces a surface cross-linked layer which is devoid of the carboxyl group or the carboxyl salt. Meanwhile, when the surface cross-linkage proceeds insufficiently or heterogeneously, the carboxyl salt in the interior of the resin survives on the cross-linked surface. As a result, the homogeneity of the surface cross-linking treatment can be detected by determining the carboxyl salt concentration and consequently the metal atom concentration in the surface layer of the produced surface cross-linked water absorbent resin. Then, by determining the metal atom concentration toward the center while continuously polishing the resin surface, it is made possible to detect the thickness of the surface cross-linked layer based on the change of concentration. Since the degree of polishing is correlated with the hardness of the resin, the hardness of the resin surface can be detected by determining the metal atom concentration while continuously polishing the resin with a prescribed polishing force.

This invention, based on this principle, is aimed at providing a water absorbent material formed of a surface cross-linked water absorbent resin which, when polished by Ar ion discharge polishing as means of polishing under a voltage of 500 V, shows a metal atom concentration falling in the range of 0-10% at 0 second value of the polishing and falling 2-35% at 10 seconds value of the polishing. The water absorbent material which possesses such characteristic properties also excels in absorption properties because the surface cross-linkage proceeds homogeneously and gives rise to appropriate surface hardness. Incidentally, the expression "the metal atom concentration on the surface of the water absorbent material" as used in this invention refers to the percentage of the number of metal atoms to the number of atoms forming the surface layer of the water absorbent material which results from subjecting a water absorbent material to Ar ion discharge polishing. The expression "the metal atom concentration at 0 second value of the polishing" means the percentage of the number of metal atoms to the number of atoms forming the outermost layer of the cross-linked surface under the state of non-polishing. Now, this invention will be described in detail below.

The water absorbent material of this invention is evaluated by the metal atom concentration on the surface of the water absorbent material which is determined by subjecting a sample to Ar ion discharge polishing under a voltage of 500V. The water absorbent material is polished by argon ion sputtering and the peak ratio originating in the metal atoms during the course of the sputtering. To be specific, about 0.1 g of a given water absorbent material is fixed on an electroconductive adhesive tape and polished continuously by exposure to the discharge of aragon ions under a voltage of 500 V and the metal atom concentration on the surface exposed by the polishing is measured along the course of time. The metal atom concentration thus obtained, therefore, constitutes the mean value of the water absorbent material used for the test.

FIG. 1 shows the results of polishing a water absorbent material A and a water absorbent material B with an Ar ion discharge polishing device (made by JOEL K.K. and sold under the trademark designation of "JPS-9000 MX) under the conditions of MgKα of 10 kV, 10 mA, and an integration of 10 cycles under a voltage of 500 V for 70 seconds. By the actual determination, the metal atom concentrations found at 0 second, 10 seconds, 40 seconds, and 70 seconds times of the polishing were respectively 0%, 19%, 27%, and 35% in the water absorbable material A and 17%, 40%, 42%, and 42% in the water absorbable material B.

From FIG. 1, it is clear that the water absorbent material B showed a metal atom concentration of 17% at 0 second value of the polishing, indicting that it either formed no cross-link or gave rise to a heterogeneous surface cross-linked layer. Meanwhile, the water absorbent material A showed a metal atom concentration of 0% at 0 second value of the polishing, indicating that this water absorbent material formed a surface cross-linked layer. The water absorbent material B showed a fixed metal atom concentration in the range of 40-42% at more than 10 seconds value of the polishing, indicating that the crushing reached the interior of the water absorbent material at 10 seconds value of the polishing, the surface of the water absorbent material was soft, and the cross-linked surface layer had a small thickness. Meanwhile, the water absorbent material A showed a gradual increase of metal atom concentration at 70 seconds value of the polishing, indicating that it had higher wear resistance than the water absorbable material B and the surface cross-linked layer was hard or thick. Since the water absorbent material A possessed more uniform surface cross-linked layer than the water absorbable material B, it is presumed to excel in the coefficient of water absorption under load. Incidentally, the Ar ion discharge under a voltage of 500 V has been demonstrated to form a cut of about 30-40 nm/min in a model material of $SiO_2$ and a cut of 55 nm/min in a model material of PMMA. The metal atom concentration on the surface of the water absorbent material determined by the Ar ion discharge polishing in this invention is supposed to be a numerical value to be determined by the method described in a working example cited herein below.

The water absorbent material of this invention is formed of a surface cross-linked water absorbent resin and does not exclude other copolymerizing component having acrylic acid or a metal salt thereof as a main component. Thus, a functional group other than the carboxyl group is allowed to exist. When this functional group reacts with the compound for neutralizing the water absorbent resin, it survives as a metal atom in the resin. The metal atoms which are subjected to the determination by the Ar ion discharge polishing in this invention, therefore, are those metal atoms which are destined to form the salts of neutralization of acrylic acid and other functional group contained in the water absorbent resin, namely such atoms of the first group as lithium, sodium, potassium, and rubidium and such atoms of the second group as beryllium, magnesium, and calcium. When the acrylic acid and the water absorbent resin are neutralized with sodium hydroxide and potassium hydroxide, for example, the carboxyl group exists in the form of a sodium salt or a potassium salt. In this case, the total concentration of sodium atoms and potassium atoms exposed by the polishing is utilized for the evaluation.

By determining the concentration of the metal atoms which are exposed on the surface of the water absorbent material in consequence of the Ar ion polishing as described above, it is made possible to reveal the state of the surface cross-linked layer of the water absorbent material. This invention contemplates the water absorbent material which shows a metal atom concentration in the range of 0-10%, preferably in the range of 0-7%, and particularly preferably in the range of 0-5% further preferably in the range of 0-2% at 0 second value of the polishing and a metal atom concentration of 2-35%, 10-35%, more preferably 10-30% at 10 seconds value of the polishing. If the metal atom concentration exceeds 10% at 0 second value of the polishing, the overage will possibly render the homogeneity of the surface cross-linkage insufficient and degrade the absorption properties. Incidentally, the metal atom concentration at 10 seconds value of the polishing faithfully represents the state of cross-linkage in the neighborhood of the outermost layer of the cross-linked surface. If the metal atom concentration exceeds 35% at 10 seconds value of the polishing, the overage will possibly lower the density of cross-linkage and render the absorption properties deficient.

Meanwhile, by determining the metal atom concentration in accordance with the Ar ion polishing mentioned above, it is made possible to evaluate the changes of the metal atom concentrations in the cross-linked surface layer of the water absorbent material and the interior of the water absorbent material in consequence of the advance of the polishing. For this invention, the fulfillment of the relation expressed by the following formula between the polishing time X and the metal atom concentration (%) Y which are derived from the metal atom concentrations of the water absorbent material found by the Ar ion discharge polishing mentioned above at 0 second, 10 seconds, 40 seconds, and 70 seconds value of the polishing proves more favorable.

$$Y=aX+b$$

wherein $0.30 \leq a \leq 0.60$ and $0<b<20$ and X denotes length of time (0, 10, 40, and 70 sec)

The preceding formula is based on empirical values. On the right side, the symbol b is the metal atom concentration on the outermost surface of a given water absorbent material and the symbol a is the degree of the increase of the metal atom concentration in the direction from the surface to the interior of the water absorbent material. The water absorbent material contemplated by this invention is only required to fulfill the aforementioned relation in the formula, Y=aX+b, to be calculated from the metal atom concentrations found at 0 second, 10 seconds, 40 seconds, and 70 seconds value of the polishing according to the method of Ar ion discharge polishing mentioned above. In the water absorbent material, a slope of a is 0.30-0.60, preferably 0.40-0.60, b is a relation of $0<b<20$, preferably $5<b<20$. The fact that Y exceeds 20% at 0 second value of the polishing means that the surface cross-linkage is heterogeneous. When the shape of a is small or Y is less than 0% after 0 second of the polishing and the value is small, surface cross-linking is homogeneous, but cross-linked layer is hard or there is possibility to decrease the function the osmotic load originated from the polymer itself. When the polishing time X and the metal atom concentration (%) Y fulfill the relation mentioned above, the homogeneity of the surface cross-linked layer and the hardness of the surface cross-linked layer are optimal for a water absorbent material and the formation of a homogeneous surface cross-link ensures a high rate of absorption of blood, solution dispersibility, and water absorption properties. Incidentally in FIG. 1, the relational formula of the polishing time X and the metal atom concentration (%) Y is Y=0.43X+7.35 for the water absorbent material A and Y=0.2633X+27.35 for the water absorbent material B. The linear lines consequently obtained are also shown in FIG. 1.

The characteristic properties of the water absorbent material depend on the kinds and the quantities of the functional groups present on the outermost surface of the water absorbent material. Among other functional groups mentioned above, the carboxyl group and the carboxyl salt which are present on the surface of the water absorbent material form the cause for coloration during storage and induce degradation of fluidity, adhesiveness, and handling property. The carboxyl group (metal salt) of this quality survives on the cross-linked surface of the water absorbent material when the surface cross-linkage is not performed homogeneously or it is performed only insufficiently. When the quantity of the carboxyl group present on the cross-linked surface is detected, it can serve as the index for seeking the characteristic properties of the surface of the water absorbent material. In this invention, the water absorbent material is formed of a surface cross-linked water absorbent resin which results from surface cross-linking a water absorbent resin having acrylic acid or a metal salt thereof as a main component and a ratio of partial neutralization in the range of 50-90 mol %. The ratio of the number of fluorine atoms to the number of carbon atoms (F/C ratio) in the neighborhood of the surface in which the —COOH present in the water absorbent material has been converted to the —COOCH$_2$CF$_3$ is preferably not more than 0.03, more preferably in the range of 0.02-0.01, and particularly preferably in the range of 0-0.01. Fundamentally, the carbon forming the carboxyl group (—COOH: number of carbon atom 1) in the acrylic acid (H$_2$C=CHCOOH: number of carbon atoms 3) is ⅓=0.33. In the water absorbent material having a ratio of neutralization of acrylic acid in the range of 50-90 mol %, 10-50% of the —COOH survives in the form of —COOH. The functional group of —COOH, therefore, protrudes from the surface layer when the surface layer has not been cross-linked fully satisfactorily. When the F/C ratio is not more than 0.03, however, the water absorbent material excels in such absorption properties as coefficient of water absorption, rate of absorption of blood, and absorption velocity and in low hygroscopicity as well because the functional groups are few and the homogeneity of surface cross-linkage is secured. Incidentally, the F/C ratio is the magnitude determined by the method described in the working example cited hereinbelow.

The water absorbent material of this invention preferably has a weight average particle diameter in the range of 200-300 µm more preferably 220-280 µm, especially preferably 240-260 µm. In this range, the water absorbent material has fine particle diameters and particle distribution is sharp, so it is superior in absorption properties, especially retention capacity an aqueous solution water absorbent material produces a smooth touch and avoids emitting a feeling of alien substance because no coarse particles are contained. In consequence of recent years' growing trend of sanitary material such as disposable diapers and sanitary napkins towards increasing high functionality and decreasing thickness, and increasing an amount percent of the water absorbent resin to be used per sheet of sanitary material and a weight of the water absorbent resin to the absorbent comprising the water absorbent resin and hydrophilic fibers. That is, thickness of the sanitary material is aimed without decreasing absorption capacity by decreasing an amount of the hydrophilic fibers having small balk density and using the water absorbent resin having excellent absorption capacity and large bulk density. However, considering passing through and diffusion of the liquid, a large amount of the water absorbent resin becomes soft gel-like and generates phenomenon which disturb diffusion of the so-called gel-blocking. Therefore, it is thought that the balance between an absorption property originated from the physical shape and an absorption property originated from osmotic load of the polymer itself which is generated by surface cross-linking treatment is very important for the water absorbent resin used for decreasing the thickness. The water absorbent material of this invention which has a weight average particle diameter in the range of 200-300 µm is particularly suitable for such absorbent products as the disposable diaper having a decreased thickness.

Then, the proportion of the water absorbent material having a particle diameter of less than 106 µm is preferably in the range of 0-10 mass %, more preferably in the range of 0-7 mass %, still more preferably in the range of 0-5 mass %, and most preferably in the range of 0-3 mass %. So long as the proportion of the water absorbent material measuring less than 106 µm in particle diameter falls in the range mentioned above, the absorbent product such as the disposable diaper is enabled to secure a high total rate of absorption, restrain the occurrence of dust during the course of handling, and maintain the working atmosphere in an ideal condition. The magnitude of the logarithmic standard deviation $\delta\zeta$ which indicates the dispersibility of particle diameter is preferably in the range of 0.25-0.45, more preferably in the range of 0.25-0.42, and most preferably in the range of 0.25-0.40, further preferably in the range of 0.25-0.38. By controlling the magnitude of the logarithmic standard deviation $\delta\zeta$ which indicates the dispersibility of particle diameter in the range mentioned above, it is made possible to repress the segregation of particles, reduce fluctuation of the performances of the absorbent products such as the disposable diaper when the products are continuously manufactured, and permit the manufacture of the absorbent products to be manufactured stably.

Specifically, when the metal atom concentration of a water absorbent material is determined while the material is being polished by the method of Ar ion discharge polishing, the absorption properties are varied with the average particle diameter of the water absorbent material even if the thickness of the cross-linked surface layer and the gradient of the metal atom concentration to the core of the water absorbent material are steady. The water absorbent material which has the weight average particle diameter and the proportion of water absorbent material measuring less than 106 µm in particle diameter both in the respective ranges mentioned above and which fulfills the condition of the metal atom concentration on the surface of the water absorbent material, however, excels in absorption properties and the handling property. Further, the water absorbent material of this invention which satisfies the characteristic properties mentioned above possesses homogeneous surface cross-linkage and the optimum surface cross-linked layer for a water absorbent material and, therefore, manifests a coefficient of physiological saline solution absorption exceeding 35 (g/g) and preferably falling in the range of 35-60 g/g, more preferably in the range of 35-50 g/g, most preferably in the range of 40-50 g/g. While the coefficient of water absorption is preferred to be as high as permissible, it may be selected in conformity with the balance of solid state properties and the cost. The rate of blood absorption is in the range of 70-100% and preferably in the range of 80-100%. Incidentally, the coefficient of water absorption and the rate of blood absorption are supposed to be determined by the methods which are described in the working example cited herein below.

In the water absorbent material of this invention, the content of the residual epoxy compound is preferred to be not more than 5 ppm. As the surface cross-linking agent, the epoxy type surface cross-linking agent is frequently used on account of the ability thereof to form a surface cross-link at a low temperature. The residual epoxy of high reactivity, however, deteriorates the surface of the water absorbent material and varies the surface properties. For this invention, the content of the residual epoxy compound in the water absorbent material is in the range of 0-5 ppm, preferably in the range of 0-1 ppm, and particularly preferably in the range of 0-0.5 ppm. The absorption velocity (Vortex) is 1-30 seconds and preferably 1-25 seconds and the hygroscopicity is not more than 3% and preferably not more than 2%.

The method for producing the surface cross-linked-resin which forms the water absorbent material of the quality described above does not need to be particularly restricted. It can be produced in accordance with the second aspect of this invention.

The second aspect of this invention is directed toward a method for the production of a surface cross-linked water absorbent resin, comprising a step of mixing irregularly pulverized shaped particles comprising the product of partial neutralization or whole neutralization of a water absorbent resin having a weight average particle diameter in the range of 200-300 μm and having acrylic acid or a metal salt thereof as a main component with a solution of a surface cross-linking agent containing a) 0.1-1 mass part of a first cross-linking agent which is a compound having a solubility parameter (SP value) of not less than 11.5 $(cal/cm^3)^{1/2}$ $[2.35 \times 10^4 (J/m^3)^{1/2}]$ and possessing an ability to react with the carboxyl group possessed by the water absorbent resin, b) 0.015-0.5 mass part of a second cross-linking agent which is a compound having a solubility parameter (SP value) of less than 11.5 $(cal/cm^3)^{1/2}$ $[2.35 \times 10^4 (J/m^3)^{1/2}]$ and possessing an ability to react with the carboxyl group possessed by the water absorbent resin, and c) 0-2 mass parts of water based on 100 mass parts of the solid component of the resin.

The water absorbent resin absorbs water and swells as soon as it is exposed to a surface cross-linking agent containing water. When the agent for the surface cross-linking treatment has a large water content, the surface cross-linked layer tends to be formed heterogeneously. It has been heretofore common, therefore, to perform the surface cross-linking treatment in the presence of more than 2.0 mass % of water. This invention has issued from the discovery that even when the water content is restricted to not more than 2 mass % based on 100 mass parts of the solid component of resin, the surface cross-linking treatment of extremely high surface homogeneity can be carried out by incorporating in the resin the second cross-linking agent having solubility parameter of less than 11.5 $(cal/cm^3)^{1/2}$ at a ratio in the range of 0.015-0.5 mass part and at the same time the first cross-linking agent having solubility parameter of not less than 11.5 $(ca/cm^3)^{1/2}$ at a ratio in the range of 0.1-1 mass part. Particularly, the water absorbent resin having a weight average particle diameter in the range of 200-300 μm is not easily dispersed homogeneously in the solution of a surface cross-linking agent containing water in a large amount on account of the great fineness. With the composition mentioned above, the surface cross-linked water absorbent resin possessing a proper thickness homogeneously toward the core of resin particles can be manufactured because the composition excels in dispersibility into the water absorbent resin.

In the surface cross-linking treatment of this nature, the resin given a surface cross-linking treatment in the presence of 0.3 mass part of water added to the surface cross-linking agent based on 100 mass parts of the water absorbent resin and the resin given a surface cross-linking treatment in the absence of water were tested for changes of metal atom concentration on the surface of the resin determined by the method of Ar ion discharge polishing. The results are shown in FIG. 2. In the actual measurement, the resin prepared in the presence of 0.3 mass % of water showed metal atom concentrations of 0%, 19%, 27%, and 35% respectively at 0 second, 10 seconds, 40 seconds, and 70 seconds value of the polishing and the resin prepared in the absence of water showed metal atom concentrations of 0%, 26%, 35%, and 42% respectively at 0 second, 10 seconds, 40 seconds, and 70 seconds value of the polishing. The resin (0.3 mass % of water) and the resin (0 mass % of water) both showed a metal atom concentration of 0% at 0 second value of the polishing, indicating that the surface cross-linkage proceeded homogeneously. Meanwhile, the resin (0.5 mass % of water) showed a metal atom concentration of 19% and the resin (0 mass % of water) showed a metal atom concentration of 26% at 10 seconds of the polishing, indicating that the metal atom concentrations differed widely. The inclinations of increase of metal atom concentration between the two points, namely at 10 second and 7.0 seconds value of the polishing, in the two resins were in parallel. It is clear from these results that the concentration of water in the surface cross-linking agent imparts a great influence on the metal atom concentration and the state of metal cross-linkage of the outermost surface layer during the course of the surface cross-linking treatment.

The water absorbent resin which can be used in this invention prior to the surface cross-linking treatment is obtained by polymerizing a hydrophilic unsaturated monomer having acrylic acid or a metal salt thereof as a main component. Generally, the hydrophilic cross-linked polymer having a coefficient of absorption of deionized water in the range of 20-1,000 g/g, preferably in the range of 50-1,000 g/g, and more preferably in the range of 100-1,000 g/g and exhibiting an ability to swell with water and avoid solving in water (it means that 0-50 mass %, preferably 0-30 mass % of soluble content (extra table content) defined by U.S. Re 32649) may be cited as an example. The hydrophilic cross-linked polymer is more preferably such that of the acid group in the cross-linked polymer, the proportion such as, for example, 50-90 mol %, preferably 60-80 mol %, and particularly 65-75 mol %, has been neutralized with an alkali metal salt, ammonium salt, or amine salt, for example. This neutralization of the acrylic acid group may be preparatorily performed during the course of manufacturing the hydrophilic unsaturated monomer as the predecessor for the cross-linked polymer and the polymerization reaction may be subsequently started. Otherwise, the acid base of the cross-linked polymer obtained during the polymerization or after completion of the polymerization reaction may be neutralized. These two procedures may be carried out jointly. The expression "having acrylic acid or a metal salt as a main component" means that the hydrophilic unsaturated monomer contains 50-100% of acrylic acid or a metal salt thereof. The hydrophilic unsaturated monomer mentioned above, when necessary, may contain an unsaturated monomer besides the acrylic acid or the metal salt thereof.

As typical examples of the other monomer, anionically unsaturated monomers such as methacrylic acid, maleic acid, vinyl sulfonic acid, styrene sulfonic acid, 2-(meth)acrylamide-2-methyl propane sulfonic acid, 2-(meth)acryloyl ethane sulfonic acid, and 2-(meth)acryloyl propane sulfonic acid and salts thereof; nonionic hydrophilic group-containing unsaturated monomers such as acryl amide, methacryl amide, N-ethyl(meth)acryl amide, N-n-propyl(meth)acryl amide, N-isopropyl(meth)acryl amide, N,N-dimethyl(meth)acryl amide, 2-hydroxyethyl(meth)acrylate, 2-hydroxypropyl (meth)acrylate, methoxypolyethylene glycol(meth)acrylate, polyethylene glycol mono(meth)acrylate, vinyl pyridine, N-vinyl pyrrolidone, N-acryloyl piperidine, and N-acryloyl pyrrolidine; and cationic unsaturated, monomers such as N,N-dimethylaminoethyl(meth)acrylate, N,N-diethylaminoethyl(meth)acrylate, N,N-dimethylaminopropyl(meth)acrylate, N,N-dimethyl-aminopropyl(meth)acrylamide, and quaternary salts thereof may be cited, though not limitatively.

During the formation of the water absorbent resin mentioned above, the cross-linked structure is preferred to be introduced to the interior by the use of an inner cross-linking agent. The inner cross-linking agent may be a compound which possesses a plurality of reactive: group capable of reacting with the polymerizing unsaturated group and/or the carboxyl group in the molecular unit thereof, though not particularly limitatively. That is, the inner cross-linking agent is only required to be a compound which possesses a plurality of substituent groups capable of copolymerizing with the hydrophilic unsaturated monomer and/or reacting with the carboxyl group. Incidentally, the hydrophilic unsaturated monomer may be formed of a cross-linking type compound which forms a cross-linked structure without using the inner cross-linking agent.

As typical examples of the inner cross-linking agent, N,N'-methylene bis(meth)acryl amide, (poly)ethylene glycol di(meth)acrylate, (poly)propylene glycol di(meth)acrylate, trimethylol propane tri(meth)acrylate, trimethylol propane di(meth)acrylate, glycerin tri(meth)acrylate, glycerin acrylate methacrylate, ethylene oxide-modified trimethylol propane tri(meth)acrylate, pentaerythritol tetra(meth)acrylate, dipentaerythritol hexa(meth)acrylate, triallyl cyanurate, triallyl isocyanurate, triallyl phosphate, triallyl amine, poly (meth)acryloxy alkane, (poly) ethylene glycol diglycidyl ether, glycerol diglycidyl ether, ethylene glycol, polyethylene glycol, propylene glycol, glycerin, pentaerythritol, ethylene diamine, polyethylene imine, and glycidyl(meth)acrylate may be cited, through not particularly limitatively. These inner cross-linking agents may be used either singly or in the form of a mixture of two or more members. In the inner cross-linking agents enumerated above, by using an inner cross-linking agent which possesses a plurality of polymerizing unsaturated groups in the molecular unit thereof, it is made possible to exalt further the absorption properties of the produced water absorbent resin.

The amount of the inner cross-linking agent to be used is preferably in the range of 0.0001-3 mol %, more preferably in the range of 0.001-2 mol %, and particularly preferably in the range of 0.05-1 mol %, based on the amount of the hydrophilic unsaturated monomer. When the water absorbent resin is obtained by polymerizing the hydrophilic unsaturated monomer, the reaction system may incorporate therein hydrophilic polymeric compounds such as starch, starch derivative, cellulose, cellulose derivative, polyvinyl alcohol, polyacrylic acid (salt), polyacrylic acid (salt) cross-linking agent; chain transfer agents such as hypophosphorous acid (salt); and a water-soluble or water-dispersible surface active agent in an amount in the range of 0-100 mass % and preferably in an amount of 0-10 mass %.

The method for polymerizing the hydrophilic unsaturated monomer does not need to be particularly restricted. Any of the known methods such as aqueous solution polymerization, bulk polymerization, and precipitation polymerization may be adopted. From the viewpoint of performance and on account of the ease of control of polymerization, it is preferable to prepare an aqueous solution of the monomer and subject the solution to aqueous solution polymerization. Then, the reaction conditions such as reaction temperature and reaction time do not need to be particularly restricted but may be properly set in conformity with the composition of the monomer component to be used.

In polymerizing the hydrophilic unsaturated monomer, a radical polymerization initiator such as potassium persulfate, sodium persulfate, ammonium persulfate, t-butyl hydroperoxide, hydrogen peroxide, or 2,2'-azobis(2-amidinopropane) dihydrochloride; a radical photopolymerization initiator such as 2-hydroxy-2-methyl-1-phenyl-propan-1-on; and an active energy ray such as ultraviolet light or electron ray may be used. Then, when the oxidizing radical polymerization initiator is used, redox polymerization may be carried out by additionally using a reducing agent such as sodium sulfite, sodium hydrogen sulfite, ferrous sulfate, or L-ascorbic acid, for example. The amount of the polymerization initiator to be used is preferably in the range of 0.001-2 mol % and more preferably in the range of 0.01-0.5 mol %.

Subsequently, the hydrogel-like polymer which is obtained by the method of polymerization mentioned above is dried. For this drying, an ordinary drying machine or heating furnace can be used. A thin stirring drier, a rotary drier, a disc drier, a fluidized bed drier, an air current drier, and an infrared drier are concrete examples of the device available.

The dried polymer obtained by the drying mentioned above may be used in its unaltered form as a water absorbent resin. It may be otherwise pulverized and classified to separate a portion having an average particle diameter in the range of 200-300 µm and a portion having an average particle diameter of less than 106 µm at a ratio in the range of 0-10 mass %, preferably in the range of 0-7 mass %, more preferably in the range of 0-5 mass %, and particularly preferably in the range of 0-3 mass %. In this invention, the logarithmic standard deviation $\delta\zeta$ does not need to be particularly restricted. Even when this deviation is in the range of 0.25-0.45, the surface cross-linkage can be homogeneously carried out by using a specific surface cross-linking agent. Otherwise, even by (1) a method which pulverizes a water absorbent resin with a specific crusher or (2) a method which granules and puts to selection a palpable powder, the water absorbent resin which is separated into a portion having an average particle diameter in the range of 200-300 µm and a portion having an average particle diameter of less than 106 µm at a ratio in the range of 0-10 mass % can be manufactured.

(1) Crusher

The crushers which are usable herein are those classified under shear granulating machines, impact crushers, and high-speed rotation crushers found in the names of crushers classified in Table 1.10 of Powder Engineering Handbook (compiled by Powder Engineering Society, initial edition). The crushers which are endowed with one or more of the pulverizing mechanisms of cutting, shear, impact, and friction can be favorably used and the crushers which are endowed with cutting and shearing mechanisms as main functions prove particularly favorable. Alternatively, the crushers which are classified under rolling machines and roll mills (roll rotation machines) and are furnished with compression mechanisms for the function of crushing can be used where the shearing and cutting effects are expected to be strong. Among other crushers enumerated above, the device which effects necessary pulverizing by the shear generated by a plurality of rotary blades and a fixed blade prove particularly advantageous. The peripheral speed of such a rotary blade is in the range of 3.0-200 m/sec. and preferably in the range of 5.0-150 m/sec. The pulverizing effected by the use of a high-speed gyratory blade excels in productivity because it induces virtually no emission of a palpable powder and enjoys a high pulverizing efficiency. If the peripheral speed of this high-speed gyratory blade falls short of 3.0 m/sec., the shortage will possibly result in inducing an extreme decrease in the amount of treatment, adding to the diameter of the ground particles as well, increasing the kneading of the material, and adding to the soluble component. Conversely, if the peripheral speed exceeds 200 m/sec., the overage will possibly boost the cost of equipment in spite of an increase in the amount of treatment.

In this invention, by pulverizing a hydrogel-like polymer having a water content of not less than 10 mass % and not more than 30 mass % by the use of a pulverizing, it is made possible to obtain with high productivity a particulate water absorbent resin which is found in the particle diameter distribution performed after the pulverizing step not preceded by a classifying operation or after the pulverizing-drying step not preceded by a classifying operation to include fine particles not less than 150 μm and not more than 850 μm in particle diameter at a ratio of not less than 75 mass %. It is further made possible to obtain with high productivity a particulate water absorbent resin which contains fine particles less than 150 μm in particle diameter at a ratio of not more than 15 mass % and/or extremely fine particles less than 106 μm in particle diameter at a ratio of less than 10 mass %. It is also easy to obtain with high productivity particulate water absorbent resin which contains particles having particle diameters in a narrow range of not less than 150 μm and not more than 500 μm at a ratio of not less than 50 mass %, fine particles less than 150 μm in particle diameter at a ratio of not more than 15 mass %, and/or fine particles not more less than 150 μm and not more than 500 μm at a ratio of not less than 50 mass % and fine particles less than 106 μm in particle diameter at a ratio of not more than 10 mass % by pulverizing.

(2) Granulation of Fine Powder

When an aqueous liquid is used as a binder, the aqueous liquid and the fine powder contained in the powdered water absorbent resin are mixed to form a coking granular mass, and this granular mass is granulated, the impalpable powder can be removed and the granularity can be adjusted in a prescribed range. Incidentally, when the amount of the aqueous liquid to be used is large and the granular mass consequently acquires an adhesive surface, the adhesiveness of the surface can be allayed by allowing the granular mass to stand at rest for a fixed length of time or applying heat thereto. The heating is required to be performed at a temperature in the range of 50°-200° C. for a period in the range of 3 minutes-12 hours and more preferably in the respective ranges of 700-120° C. and 10 minutes-2 hours. Incidentally, the drying is not always required. The aqueous liquid which can be used is either water alone or a mixed liquid with an organic solvent compatible with water. The amount of water to be incorporated is in the range of 50-100 mass % and preferably in the range of 70-100 mass %. As concrete examples of the organic solvent which is compatible with water, lower alcohols, tetrahydrofuran, and acetone may be cited. The aqueous binder mentioned above may be may be further dissolved or decomposed in a varying compound or mixture. As typical examples of the compound or the mixture which is available here, the deodorants and the plant growth auxiliaries described in JP-A-61-97333 and the slurry of a finely particulate silica may be cited. Incidentally, the amount of the aqueous liquid to be added to the fine powder does not need to be particularly restricted but may be selected in a wide range. If this amount is unduly small, the shortage will render it difficult to obtain a conspicuous granulating effect. If the amount is unduly large, the overage will possibly induce deterioration of the absorption properties unless the step of drying follows the granulating operation. The amount of the aqueous liquid is preferably in the range of 1-50 mass parts and more preferably in the range of 3-35 mass parts based on 100 mass parts of the water absorbent resin.

The water absorbent resin obtained as described above may be in any of the forms such as irregularly pulverized pieces, granules, bars, fibers, and scales. Generally, the irregularly pulverized pieces are thought to undergo homogeneous surface cross-linkage with difficulty. In this invention, even the water absorbent resin particles of this form can be made by using a specific surface cross-linking agent to give rise to a water absorbent resin possessing a homogeneous surface cross-linked layer. Incidentally, the expression "weight average particle diameter" of a water absorbent resin as used in this invention refers to the weight average diameter of the particles which are obtained by classifying a given powdered polymer with the testing screen (JIS [Japanese Industrial Standards] Z 8801-2000) consisting of the sieves of mesh sizes of 500 μm, 425 μm, 355 μm, 300 μm, 150 μm, 106 μm, and 75 μm, plotting the residual percentages R on a logarithmic probability paper, and separating the particles answering R=50%. For the particle-size distribution, the logarithmic standard deviation δζ which is expressed by the following formula is used as the index. This formula signifies that the particle-size distribution narrows in accordance as the numerical value of decreases. The following formula can be satisfied by properly changing the mesh sizes of the sieves.

$$\delta\zeta = 0.5 \times \ln(X_2/X_1)$$

wherein $X_1$ and $X_2$ denote the particle diameters obtained by performing linear approximation at the two neighboring points, R=84.1% and R=15.9%.

The hydrogel-like polymer obtained as described above, namely the water absorbent resin not preceded by a surface cross-linking operation, has a water content (drying at 180° C. for 3 hours) of less than 10 mass %, preferably less than 7 mass %, more preferably less than 5 mass %. If the water content of the water absorbent resin exceeds 10 mass %, the overage will possibly result in suffering the carboxyl group and the carboxyl salt to survive on the cross-linked surface because the first cross-linking agent and the second cross-linking agent to be used in this invention will not be homogeneously dispersed on the surface.

The first cross-linking agent which can be used in this invention is a compound which has a solubility parameter (SP value) of not less than 11.5 $(cal/cm^3)^{1/2}[2.35\times10^4 (J/m^3)]$ and is capable of reacting with the carboxyl group possessed by the aqueous resin precursor. The solubility parameter (SP value) is generally used as the factor for expressing the polarity of a given compound. This invention is supposed to adopt the numerical value of the solubility parameter (SP value) δ $\{(cal/cm^2)^{1/2}\}$ of solvent described in "Polymer Handbook, $3^{rd}$ edition (published by Wiley Interscience, Inc.), V II-527-539. Regarding a cross-linking agent which is not described in this table, this invention is supposed to adopt the numerical value δ $[(cal/ca^3)^{1/2}]$ which is derived by substituting Hoy's cohesive energy constant described in VII-525 in Small's formula shown in VII-524 of the same handbook.

As typical examples of the first cross-linking agent which has a solubility parameter (SP value) of not less than 11.5 $(cal/cm^3)^{1/2}$ and is capable of reacting with the carboxyl group, ethylene glycol, propylene glycol, glycerin, pentaerythritol, sorbitol, ethylene carbonate, propylene carbonate, propylene carbonate, diethylene glycol, 1,3-butane diol, 1,4-butane diol, 1,5-pentadiol, 2,4-pentadiol, 1,6-hexanediol, 2,5-hexanediol, trimethylol propane, diethanol amine, and 4,5-dimethyl-1,3-dioxylan-2-on may be cited. These first cross-linking agents may be used either singly or in the form of a mixture of two or more members. Among other examples enumerated above, those which have solubility parameters (SP value) of not less than 13.0 $(cal/cm^3)^{1/2}$ prove preferable.

The second cross-linking agent which can be used in this invention is a compound which has a solubility parameter (SP value) of less than 11.5 $(cal/cm^3)^{1/2}$ and is capable of reacting with the carboxyl group possessed by the aqueous resin precursor. As typical examples of this cross-linking agent, triethyleneglycol, tetraethylene glycol, dipropyleneglycol, tripropylene glycol, triethanol amine, ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, ethylene diamine, diethylene triamine triethylene tetramine, 2,4-trilene diisocyanate, hexamethylene diisocyanate, epichlorohydrin, and epibromohydrin may be cited. These second cross-linking agents may be used either alone or in the form of a mixture of two or more members. Among other examples enumerated above, those which have solubility parameter (SP value) in the range of 9.5-11.0 $(cal/cm^3)^{1/2}$ prove more preferable.

Furthermore, in selecting the first and the second cross-linking agent, it is preferable to make this selection so that the difference between the solubility parameter (SP value) of the first cross-linking agent and the solubility parameter (SP value) of the second cross-linking agent may be not less than 2 $(cal/cm^3)^{1/2}$. If the difference of solubility parameter (SP value) is less than 2 $(cal/cm^3)^{1/2}$, the shortage will possibly result in preventing the effect of using the two kinds of cross-linking agent from easily appearing and rendering it difficult to exalt the absorption properties of the produced water absorbent resin under load. More preferably, the selection is so made that the difference between the solubility parameter (SP value) of the first cross-linking agent and the solubility parameter (SP value) of the second cross-linking agent may be not less than 2.5 $(cal/cm^3)^{1/2}$, preferably not less than 3.0 $(cal/cm^3)^{1/2}$.

The cross-linking agent which can be used in this invention does not need to be particularly restricted but is only required to be a compound which possesses not less than two functional groups capable of reacting with the functional group possessed by the polymer. It is preferably a hydrophilic compound and more preferably a water-soluble compound. Preferred examples of the first cross-linking agent are polyhydric alcohols and preferred examples of the second cross-linking agent are polyvalent glycidyl compounds.

This invention requires additional use of water besides at least one member selected from the group of the first cross-linking agents mentioned above and at least one member selected from the group of the second cross-linking agents. The amounts of these components to be used are 0.1-1 mass part of the first cross-linking agent, 0.1-0.5 mass part of the second cross-linking agent, and 0-2 mass parts of water, more preferably 0.1-0.5 mass part of the first cross-linking agent, 0.015-0.3 mass part of the second cross-linking agent, and 0-1 mass part of water, and particularly preferably 0.1-0.3 mass part of the first cross-linking agent, 0.015-0.1 mass part of the second cross-linking agent, and 0-0.5 mass part of water based on 100 mass parts of the water absorbent resin. Particularly when the surface cross-linkage is performed on the aforementioned water absorbent resin having a weight average particle diameter in the range of 200-300 µm, the sole use of the first cross-linking agent proves unfavorable because it possibly prevents the surface cross-linkage from affording specific surface properties contemplated by this invention. If the amount of the first cross-linking agent to be used falls short of 0.1 mass part based on 100 mass parts of the water absorbent resin, the shortage will possibly result in suffering the surface cross-linkage to proceed heterogeneously because the second cross-linking agent simultaneously incorporated may not be uniformly dispersed on the surface of the resin. Conversely, if the amounts of the first cross-linking agent and the second cross-linking agent to be used exceed the ranges mentioned above, the excesses will possibly result in increasing the amounts of residual surface cross-linking agents and degrading the quality of the product. When the amount of water to be incorporated is limited within 2 mass parts, the permeation of the surface cross-linking agent into the water absorbent resin can be prevented and the resin surface can be cross-linked more heterogeneously. As a result, the produced surface cross-linked water absorbent resin has the carboxyl group or the carboxyl salt survive only in an insignificant amount on the surface thereof. Incidentally, it has been heretofore supposed that the mixture of a finely divided water absorbent resin having a weight average particle diameter in the range of 200-300 µm with such a liquid composition as a surface cross-linking agent does not easily allow homogeneous surface cross-linkage because the water absorbent resin particles coalesce and form large lumps when the particle-size distribution is wide. This invention, however, is capable of obtaining a surface cross-linked water absorbent resin possessing a homogeneous surface cross-linked layer and enjoying high hardness even when the logarithmic standard deviation δζ of the particle-size distribution of the water absorbent resin falls in a wide-range of 0.25-0.45 owing to the use of a surface cross-linking agent of a specific composition mentioned above.

The surface cross-linking agent solution to be used in this invention contains the first cross-linking agent, second cross-linking agent, and water in the respective ranges mentioned above. It may further add a hydrophilic organic solvent at a ratio in the range of 0.015-1.0 mass part and preferably in the range of 0.1-0.4 mass part based on 100 mass parts of the solid component of the water absorbent resin. As typical examples of the hydrophilic organic solvent to be used herein, lower alcohols such as methyl alcohol, ethyl alcohol, n-propyl alcohol, iso-propyl alcohol, n-butyl alcohol, iso-butylalcohol, and t-butylalcohol; ketones such as acetone; ethers such as dioxane and tetrahydrofuran; amides such as N,N-dimethyl formamide; and sulfoxides such as dimethyl sulfoxide may be cited.

In this invention, the surface cross-linking agent solution containing the first and second cross-linking agents and water is directly mixed with the water absorbent resin by spraying or dropwise addition. A preferred mixing device is required to produce a great mixing power for the purpose of ensuring homogeneous mixture. As typical examples of the mixing device which can be used in this invention, a cylindrical mixer, a double wall conical mixer, a V-shaped mixer, a ribbon type mixer, a screw type mixer, a fluidized-bed type oven rotary disk mixer, an air current type mixer, a twin arm type kneader, an inner mixer, a crusher type kneader, a rotary mixer, and a screw type extruder may be cited.

This invention mixes the water absorbent resin as the base polymer with the first and the second cross-linking agent and further heating the resultant mixture and consequently cross-links the neighborhood of the surface of the mixture.

In this invention, when the heating treatment is performed after the addition of the cross-linking agents, the temperature of this heating treatment (temperature of heating medium or material) is in the range of 100°-300° C., preferably in the range of 160°-250° C., and more preferably in the range of 180°-250° C. If the temperature of the heating treatment falls short of 100° C., the shortage will not merely add to the time required for the heating treatment and induce a decrease of the productivity but also prevent both the first and the second cross-linking agent from accomplishing homogeneous cross-linkage and forming a resin of high absorption properties under load as aimed at by this invention.

The heating treatment can be carried out by using an ordinary drying device or heating furnace. As typical examples of the device which is available for this heating treatment, a grooved type mixing drier, a rotary drier, a disc drier, a fluidized-bed drier, an air current type drier, and an infrared drier may be cited.

Heretofore, the problem that an increase of the capacity of water absorption under no load results in decreasing the coefficient of water absorption under load and conversely that an increase of the coefficient of water absorption under load results in decreasing the coefficient of water absorption under no load has always arisen. The water absorbent resin which is obtained by this invention shows veritably excellent absorption properties as evinced by excelling in the coefficient of water absorption under no load, the coefficient of water absorption under load, and the rate of blood absorption and exhibiting a high absorption velocity and low hygroscopicity. Though the cause for this excellent performance has not been definitely elucidated, it may be logically explained by a supposition that by mixing a water absorbent resin with not less than two kinds of cross-linking agent having different solubility parameters and a surface cross-linking agent having a water content in a specific range and cross-linking the resultant mixture at a temperature in the specific range, it is made possible to optimize the distribution of the two cross-linking agents in the neighborhood of the surface of the water absorbent resin, allow them to undergo a cross-linking reaction quickly, and consequently allow a cross-link possessing a peculiar density gradient which has never been accomplished by the conventional method to be formed in the neighborhood of the surface of the resin particles. Further, by restricting the weight average particle diameter and the particle-size distribution of the water absorbent resin not preceded by a surface cross-linking treatment as described above, it is made possible to acquire characteristic properties such as uniformizing the surface properties and consequently enhancing the dispersibility, diminishing the residual surface cross-linking agent and facilitating the incorporation of the secondary additives, repressing the reactivity with a functional group and consequently giving rise to an excellent mixing property (for blending a pulp), and effecting importation of excellent surface properties besides acquiring the excellent absorption properties mentioned above. The surface cross-linked water absorbent resin thus produced is capable of quickly absorbing an aqueous liquid even when this liquid is added in a large amount at once and is excellent in absorption properties such as liquid dispersibility and rate of absorption as compared with the conventional surface cross-linked water absorbent resin and, as a result, is capable of providing absorbent products such as sanitary materials.

The water absorbent material of this invention allows immediate use therefor of the surface cross-linked water absorbent resin mentioned above. This water absorbent material, therefore, can be used particularly advantageously for such absorbent products as sanitary materials including disposable diapers, sanitary napkins, and so-called incontinence pads which have been expected to enjoy an exalted function and a diminished thickness. The surface cross-linked water absorbent resin mentioned above may be endowed with a new function by the incorporation of 0-30 mass % of such additives as, for example, function enhancing agent, deodorant, perfume, inorganic powder, foaming agent, pigment, dye, hydrophilic short fibers, fertilizer, oxidant, reluctant, water, and salt.

In one of the present invention production processes, for example, the ion blocking agent and the surface-crosslinking agent which is reactable upon a carboxyl group are mixed with the above-obtained water-absorbent resin having a carboxyl group, whereby the water-absorbent agent with excellent urine resistance can be obtained.

Examples of the ion blocking agent, as used in the present invention, include the following compounds:

(1) aminocarboxylic acids and their salts; (2) monoalkylcitramides, monoalkenylcitramides, and their salts; (3) monoalkylmalonamides, monoalkenylmalonamides, and their salts; (4) monoalkylphosphoric esters, monoalkenylphosphoricesters, and their salts; (5) N-acylated glutamic acids, N-acylated aspartic acids, and their salts; (6) β-diketone derivatives; (7) tropolone derivatives; and (8) organic phosphoric acid compounds.

As to (1) aminocarboxylic acids and their salts, those which have at least three carboxyl groups are preferable in respect to their ion blocking ability. Specified examples thereof include: nitrilotriacetic acid, ethylenediaminetetraacetic acid, diethylenetriaminepentaacetic acid, triethylenetetraaminehexaacetic acid, cyclohexane-1,2-diaminetetraacetic acid, N-hydroxyethylethylenediaminetriacetic acid, ethylene glycol diethyl ether diaminetetraacetic acid, ethylenediaminetetrapropionic acid, N-alkyl-N'-carboxymethylaspartic acid, N-alkenyl-N'-carboxymethylaspartic acid, and their alkaline metal salts, alkaline earth metal salts, ammonium salts, and amine salts.

(2) Monoalkylcitramides, monoalkenylcitramides, and their salts are, for example, obtained by dehydration condensation of alcohols with citric acid.

(3) Monoalkylmalonamides, monoalkenylmalonamides, and their salts are, for example, obtained by adding α-olefins to methyl malonate and then hydrolyzing the resultant adducts.

Examples of (4) monoalkylphosphoric esters, monoalkenylphosphoric esters, and their salts include laurylphosphoric acid and stearylphosphoric acid.

Examples of (5) N-acylated glutamic acids, N-acylated aspartic acids, and their salts include Amisoft HS-11 and GS-11 as are commercially available from Ajinomoto Co., Ltd.

Examples of (6) β-diketone derivatives include acetylacetone and benzoylacetone.

Examples of (7) tropolone derivatives include tropolone, β-thujaplicin, and γ-thujaplicin.

Examples of (8) organic phosphoric acid compounds include ethylidenephosphonic acid, 1-hydroxyethylidene-1,1-diphosphonic acid, aminotrimethylenephosphonic acid, ethylenediaminetetra(methylenephosphonic acid), and diethylenetriaminepenta(methylenephosphonic acid). Particularly, 1-hydroxyethylidene-1,1-diphosphonic acid, ethylenediaminetetra(methylenephosphonic acid), and diethylenetriaminepenta(methylenephosphonic acid). Preferable examples of salts of the organic phosphoric acid compounds include salts of alkaline metals such as Na and K, and ammonium salts, and amine salts. The above organic phosphoric acid compound is known as one of metal blocking agents.

Preferable ones among the above ion blocking agents are aminocarboxylic acids having at least three carboxyl groups and their salts, and particularly, the most preferable ones are diethylenetriaminepentaacetic acid, triethylenetetraaminehexaacetic acid, cyclohexane-1,2-diaminotetraacetic acid, N-hydroxyethylethylenediaminetriacetic acid, and their salts in respect to the urine resistance because they have bulky structures or conformations.

The amount of the ion blocking agent, as used in the present invention, is different according to the surface-crosslinking agent (there is no limit of addition time, but there are addition methods at any steps of polymerization step, surface treating step, granulation step, fine powder recovery step) as used for crosslinking the neighborhood of the surface, but the amount is usually in the range of 0.0001-10 weight parts, preferably 0.0002-5 weight parts, per 100 weight parts of the solid content of the water-absorbent resin. In the case where the amount exceeds 10 weight parts, there are problems in that: no effect rewarding the amount is obtained—this is uneconomical—, and further, the absorption amount falls. In addition, in the case where the amount is smaller than 0.0001 weight parts, no effect of improving the urine resistance is obtained.

Hydrophilic inorganic compounds are examples of the function enhancing agent, to be used in this invention. Specifically, water-insoluble hydrophilic inorganic fine particles and water-insoluble polyvalent metal salts are advantageously used. As the hydrophilic inorganic fine particles referred to herein, those having degrees of hydrophilicity of not less than 70% as disclosed in EP-B-0629411, for example, may be cited. The cationic polymeric compounds cited in Column 11 of U.S. Pat. No. 5,797,893 and the hydrophobic inorganic fine particles can be used as a function enhancing agent and are capable of exalting the liquid permeability. As typical examples of these substances, mineral products such as talc, kaolin, fuller's earth, bentonite, activated clay, cawk, natural asphaltum, strontium ore, ilmenite, and pearlite; aluminum compounds such as aluminum sulfate 14-18-hydrates (or anhydrates), potassium aluminum sulfate dodecahydrate, sodium aluminum sulfate dodecahydrate, ammonium aluminum sulfate dodecahydrate, aluminum chloride, polyaluminum chloride, and aluminum oxide; other polyvalent metal salts, polyvalent metal oxides, and polyvalent metal hydroxides; hydrophilic amorphous silicas (silica of the dry method, made by Tokuyama K.K. and sold under the trademark designation of "Reolosil QS-20" and silicas of the precipitation method, made by Degussa GmbH. And sold under the tradeamark designations of "Sipernat 22S" and "Sipernat 2200"; and oxide complexes such as silicon oxide.aluminum oxide.magnesium oxide complex (the product of Engelhard Corp sold under the trademark designation of "Attagel #50", for example), silicon oxide.aluminum oxide complex, and silicon oxide.magnesium oxide complex may be cited. Further, the substances which are disclosed in U.S. Pat. No. 5,164,459 and EP-A-7612.41 can be used. It is preferable to select hydrophilic particles (such as, for example, aluminum sulfate 14-18-hydrates and hydrophilic amorphous silica) from among these particles and put them to use. When the particles have a low degree of hydrophilicity, they may be endowed with hydrophilicity by having their surfaces treated with a hydrophilic compound before they are put to use. In this invention, these function enhancing agents either singly or in the form m of a mixture of two or more members. The particle diameter of the function enhancing agent (such as powder fluidity enhancing agent, hygroscopic blocking enhancing agent, permeability enhancing agent) which can be incorporated is preferably not more than 5 µm, more preferably not more than 1 µm, and most preferably not more than 0.1 µm when the agent is in the form of inorganic fine particles. Incidentally, when an aggregate or a granulation is formed, the particle diameter of the primary particles of which the aggregate or the granulation is formed is preferred to be in the range mentioned above.

For the purpose of mixing the function enhancing agent of this nature, a method which mixes a water-soluble polyvalent metal salt such as aluminum sulfate and a cationic polymeric compound in the form of an aqueous solution, a method which effects the mixture in the form of a slurry, and a method which effects the mixture in the form of a powder are available. The method which effects the mixture in the form of a powder proves particularly favorable. The amount of the function enhancing agent to be added to the water absorbent resin particles is preferably in the range of 0.01-5 mass % and more preferably in the range of 0.05-3 mass %. If the amount of addition exceeds 5 mass %, the overage will possibly result in inducing a decrease of the coefficient of absorption. If this amount falls short of 0.01 mass %, the shortage will possibly prevent the effect of addition from being attained as expected. The mixing device does not need to be endowed with a particularly large mixing power. The mixture may be effected by a shredder or a sifter, for example. As typical examples of the mixing device which proves advantageous here, a cylindrical mixer, a double wall conical mixer, a V-shaped mixer, a ribbon type mixer, a screw type mixer, a fluidized-bed type oven rotary disk mixer, an air current type mixer, a twin arm type kneader, an inner mixer, a crusher type kneader, a rotary mixer, a screw type extruder, and a static mixer may be cited. Then, the time of addition may be before the water absorbing agent is obtained, while the production is in process, or after the production is completed. Preferably, the addition is added after the surface cross-linkage is completed.

The third aspect of this invention is directed toward a method for evaluating a water absorbent material which is formed of a surface cross-linked water absorbent resin resulting from granular irregularly pulverized shaped particles of partial neutralization or whole neutralization of a water absorbent resin having acrylic acid or a metal salt thereof as a main component. This method for evaluating the water absorbent material comprises a step of measuring along the course of time the metal atom concentration of a given water absorbent material determined by subjecting the water absorbent material to Ar ion discharge polishing under a pressurized voltage (V). The "irregularly pulverized shaped particles" in this invention means the particles which is obtained by pulverizing after drying and can broken surface (smooth face) along with the pulverization and angles can be recognized by an electron microscope or a photo microscope.

As described above with respect to the first aspect of the invention, by measuring along the course of time the metal atom concentration on the surface of the resin particles determined by the Ar ion discharge polishing, it is made possible to learn the surface properties of the water absorbent material from the atom concentration of a specific metal species during the relevant course of determination. When the conditions, $0.30 \leq a \leq 0.60$ and $0 < b < 20$, are satisfied in the relational formula, $Y = aX + b$, between the polishing time X and the metal atom concentration (%) Y at 0 second, 10 seconds, 40 seconds, and 70 seconds value of the polishing as mentioned above, the homogeneity of the surface cross-linked layer and the correlations of such factors of the surface cross-linked layer as hardness, rate of blood absorption, aggregating property, solution dispersibility, and water absorbing property can be observed. This fact means that the water absorbent material can be evaluated by measuring along the course of time the metal atom concentration on the surface of the water absorbent material particles to be determined by subjecting the water absorbent material formed of the surface cross-linked water absorbent resin resulting from surface cross-linking the product of partial neutralization or whole neutralization of the water absorbent resin having acrylic acid or a metal salt thereof as a main component to the Ar ion discharge polishing under a pressurized voltage (V). In this case, the voltage to be applied and the Ar ion discharge polishing may be properly selected in conformity with the kind and the particle diameter of the water absorbent material subjected to the evaluation and the time of determination of the metal atom concentration may be properly selected in conformity with the particle diameter, for example. Then, the relation between the results of determination and the items of evaluation can be evaluated by correlating in advance the characteristic properties possessed by the water absorbent material. In this invention, particularly the hardness of the cross-linked surface layer of the water absorbent material, the homogeneity of the surface cross-linked layer, the water absorbing property, the rate of blood absorption, the coagulating property, and the solution dispersibility can be evaluated. In consideration of the fact that the characteristic properties of a water absorbent material have been generally evaluated heretofore under the condition of actually retaining a sample in water, the successful evaluation of the characteristic properties without requiring the sample to be held in water is an epochal achievement. The method of evaluation contemplated by this invention is useful for evaluating the absorption properties and the functionality and analyzing the basic solid state properties.

Now, this invention will be specifically described below with reference to working examples. These working examples, however, are not intended to restrict this invention in any respect. The method for determination will be described hereinafter with respect to surface cross-linked water absorbent resins or absorbent articles. When a water absorbent material is used in the place of these articles, various characteristic properties of the water absorbent material can be evaluated. Incidentally, the solution to be used for the purpose of evaluating the absorption properties is an aqueous 0.9 mass % sodium chloride solution, which will be occasionally referred to as "physiological saline water" or "0.9 mass % physiological saline water" and which are invariably identical. When the water absorbent resin contained in a commercially available disposable diaper is evaluated, the water absorbent resin is dried (for example, drying at 60° C. under a reduced load for 16 hours) till an equilibrium water-containing state (for example, approximately 5 mass %) is obtained and the resultant dry sample is tested for solid state properties. Incidentally, the surface cross-linked water absorbent resin obtained by this invention was substantially insoluble in water and had a water content of not more than 7 mass % (solid content not less than 93%) invariably and a residual monomer content of not more than 400 mass ppm.

(1) Coefficient of Water Absorption (Centrifugal Retention Capacity [CRC])

About 0.20 g ($W_{p1}$) of a given surface cross-linked water absorbent resin was accurately weighed out, placed uniformly in a pouch made of nonwoven fabric (60×60 mm), heat-sealed, and then immersed in an aqueous 0.9 mass % sodium chloride solution which was controlled a temperature to 25° C.±2° C. After the lapse of 60 minutes, the pouch was pulled up, drained by the use of a centrifugal separator (product of Kabushiki Kaisha Kokusan, type H-122 small scale centrifugal separator) at 250 G (250×9.81 m/s$^2$) for 3 minutes, and weighed (Wa [g]) The same procedure was performed without using the Water absorbent resin to find the weight (Wb [g]) of the pouch. The coefficient of water absorption (g/g) of the surface cross-linked water absorbing resin was calculated in accordance with the following formula, using these weights $W_{p1}$, Wa, and Wb. Incidentally, in the case of deionized water, the sample was used in the weight of 0.02 g.

$$\text{Coefficient of water absorption}(g/g) = [Wa(g) - Wb(g)]/W_{p1}(g) - 1$$

(2) Particle Size Distribution·Weight Average Particle Diameter 10.0 g of a given surface cross-linked water absorbent resin was changed and classified by low top type sieve shock device (product of Kabushiki Kaisha Iida Seisakusho, ES-65 type sieve shock device) with sieves having meshes of 500 μm, 425 μm, 355 μm, 300 μm, 150 μm, 106 μm, and 75 μm to separate the powdered polymer for 5 minutes. The residual percentages R consequently found were plotted on a logarithmic probability paper. The particle diameter corresponding to R=50% was taken as a weight average particle diameter. Then, the particle size distribution was determined by using the logarithmic standard deviation δζ represented by the following formula was used as the index.

$$\delta\zeta = 0.5 \times \ln(X_2/X_1)$$

wherein $X_1$ and $X_2$ denote the particle diameters obtained by performing linear approximation at the approximate two points, R=84.1% and R=15.9% respectively.

(3) Rate of Moisture Absorption

About 1.0 g of a given surface cross-linked water absorbent resin was accurately weighed out, spread uniformly on an aluminum cup (bottom diameter 52 mm and height 22 mm), and left standing in a thermostat and humid stat at 25° C. and 50% RH for 24 hours. The sample was weighed (Wc [g]) at that time. Then, the hydrated water absorbent resin was dried at 180° C. for three hours and tested for absolute dry weight Wd. The rate of moisture absorption (%) of the sample was calculated in accordance with the following formula wherein it is calculated by excluding a weight of aluminum cup.

$$\text{Rate of moisture absorption}(\%) = [(Wc(g) - Wd(g))/Wd(g)] \times 100$$

(4) Example of Production of Absorber and Absorbent Article and Method for Evaluation of Performance of Absorbent Article (Model Disposable Diaper)

4-1. Preparation of Absorber

On a rectangular polyethylene film measuring 14×40 cm (basis weight 18 g/m$^2$) which served as an uncoated sheet impervious and permeable to liquid, 16.4 g of given water absorbent resin particles were spread on an area of 12×38 cm (amount of the water absorbent resin 360 g/m$^2$). On the spread sample, 3 g of flocculent pulp measuring 8×24 cm in area (density 0.04 g/cm$^3$ and basis weight 160 g/m$^2$) intended for use in an infant disposable diaper was superposed as a liquid seizing member to complete an absorber. Finally, a rectangular polyester nonwoven fabric measuring 12×40 cm in area (basis weight 2 g/cm$^2$) was mounted as a liquid-pervious surfacing material and the side parts of the fabric were sealed to complete a model absorbent article.

4-2. Liquid Passing Time·Total Rate of Absorption

The absorbent article mentioned above was fixed in a planar state on a desk with an adhesive tape. On the fixed absorbent article, an acrylic sheet measuring 12×40 cm in area (furnished in the central part thereof with a cylinder 70 mm in diameter and a load of 1.3 kg were placed as weights.

The volume 75 ml of a physiological saline water adjusted in advance to 37° C. was poured into the cylinder and the time required for the liquid to undergo thorough absorption from the surfacing sheet to the interior of the absorbent article (first cycle of liquid passing time) was measured.

This procedure was performed up to four repetitions 60 minutes apart to measure the liquid passing time (sec.).

The absorbent article mentioned above was kept immersed in a physiological saline water for one hour. Subsequently, the absorbent article was pulled up, folded into two halves with the liquid permeable surfacing material held on the lower side, and drained for 10 minutes. The weight of the material after 10 minutes' draining was measured and the total rate of absorption (g) was calculated in accordance with the following formula.

Total rate of absorption(g)=Weight(g) of absorbent article after immersion−Weight of absorbent article before immersion(g)

(5) Rate of Blood Absorption

In a petri dish 60 mm in inside diameter, 0.5 g (175 g/m$^2$) of a given water absorbent resin was uniformly spread. Then 10 g of ovine blood (fiber-free blood: fiber-free ovine blood procured from Nippon Biotest Laboratory) was added dropwise to the center point of the petri dish over a period of about 10 seconds and left standing at rest for 10 minutes. The unabsorbed liquid was adsorbed by 10 sheet of a filter paper (it is appropriately changed depending on returned amount) (ADVANTEC, product of Toyo Roshi Kabushiki Kaisha, JIS P 3801, No. 2) under 0.7 psi for one minute to find the amount of return (We, g). The amount of absorption (g) was calculated by subtracting the amount of return from 10 g of the added liquid. The rate of blood absorption based on the maximum rate of absorption 20 (=10 g/0.5 g) obtained when 10 g of ovine blood could be wholly absorbed was calculated in accordance with the following formula.

Rate of blood absorption(%)={((10−$We$)/0.5))/20}×100

(6) Metal Atom Concentration by Ar Ion Discharge Polishing

A portion of a given water absorbent resin which passed a mesh of 300 μm and stopped on a mesh of 150 μm (When collection of the sample is difficult, it is exchanged appropriately within 425-75 μm) was dried for about 4 hours. The individual samples were irradiated with accelerated ions to polish the particle surfaces by the ion bombardment. These samples were analyzed by the X ray photoelectron spectroscopy (ESCA [electron spectroscopy for chemical analysis]) to determine the functional group of the surface cross-linked water absorbent resin.

1. Preparation of Sample

Squares of about 1 cm cut from an electroconductive tape were pasted to a specimen carrier (furnished with a rectangular specimen carrying part about 6 cm×1 cm in area) and a sample was sprayed and fixed thereon. Though the carrier had a capacity for six specimens at most, the number of specimens was limited to 4 when the sample was applied by sputtering. The sample was spread in a proper amount on the electroconductive tape and, after the portion thereof loose on the tape was blown off with nitrogen gas, the remaining sample was fixed to the extent of enabling the interstices between the spread particles to disappear nearly thoroughly from vision. Incidentally, the ESCA is intended to evaluate the surface condition and attaches more importance to the fact that the sample is attached without interstices to the electroconductive tape (product of Nisshin EM Kabushiki Kaisha) than to the amount of a sample.

2. Conditions for ESCA Determination

Device: JEOL JPS-9000MX

Conditions: Kα ray used with a target of Mg, accelerating voltage: 10 kV, emission current: 10 mA, integration: 10 cycles 3. Sputtering Conditions Device: Ar ion gun (hot cathode electron bombardment type)

Conditions: Ion beam current: 50 mA, ion beam diameter: 1.5 mm, accelerated voltage of Ar ion: 500 V, accelerating current: 8.5 mA, Ar gas load: 3×10$^{-2}$ Pa 4. Determination of Sample (1) A given sample was placed in a preliminary exhaust hood and subjected to preliminary exhaustion for about 24 hours.

(2) The sample was place in a sample chamber for ESCA determination and subjected to ESCA determination to obtain the zero second value.

(3) The sample was transferred into the preliminary exhaust hood and sputtered for a designated time (a second time). After the Ar gas was released, the sample was transferred into the sample chamber for determination and subjected to the ESCA determination to obtain the a seconds data (0 second value).

(4) The same sample was sputtered for the designated time (b second time) to effect the ESCA determination and obtain the a+b seconds' data (X second value).

(5) The spluttering and the determination were repeated for a necessary duration of time.

5. Calculation of Atom Concentration (Atom %)

The photoelectron spectrum (ESCA spectrum) consequently obtained was subjected to the processing of calculation in the following procedure in accordance with the software of analysis attached to the device.

(1) The spectrum was smoothed to eliminate fine noise fragments. The reference points numbered in 11.

(2) The energy axis of the spectrum was subjected to the charge correction with the 1 s level of carbon as the standard (285 eV). Incidentally, this operation did not affect the quantitative calculation.

(3) The spectrum was deprived of a background spectrum by the calculation of the background correction. The calculation of the background correction was carried out by the Shirly method. The designation of the start·end points for the calculation of the background correction was manually carried out by confirming the peak shape on the diagram. This operation, however, affected the results of the quantitative calculation. This influence formed a factor for producing an error particularly when the ratio of contents was small and the shape of the peak was not clear.

(4) The numerical value of area (eV*cps) obtained from the spectrum was subjected to the calculation of quantitative correction using the relative sensitivity factor furnished in the software of analysis annexed to the device and the relative atomic ratios of the individual atoms (the ratios of the target metal atoms (atom %) based on the total number of C, O, and target metal atom taken as 100%) were used as the atom concentrations (atom %). When the target atom is sodium, the Na atom concentration is obtained.

(7) F/C Ratio

Given samples were individually dried at 110° C. for about 4 hours. The amount 45 mg of each of the samples was weighed out in a 10-ml sample tube and about 0.3 g of a mixed liquid consisting of 2,2,2-trifluoroethanol (TFE)/dicyclohexyl carbodiimide (DCC)/pyridine at a mol ratio of 0.02/0.001/0.04 was added thereto. The sample tube containing them was closed and heated at 60° C. for 8 hours. Then, the resultant solution and pyridine added there to were stirred together. The removal of the produced filtrate by suction with a filter paper was performed up to three repetitions to effect cleaning. Thereafter, the resultant solution was vacuum dried at about 100 Torrs for 16 hours and further at about 1 Torr for 8 hours. In consequence of the reaction, the —COOH present on the first surface of the surface cross-linked water absorbent resin was converted to —COOCH$_2$—CF$_3$. The reaction is shown below.

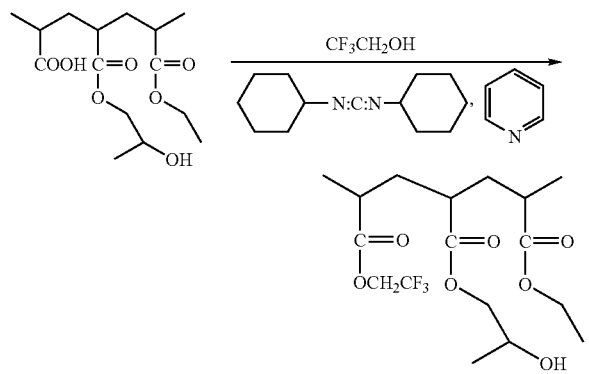

This sample was subjected to the ESCA determination under the conditions described in (7) above to analyze the functional group of the surface cross-linked water absorbent resin. The F/C ratio is shown by the following formula, i.e. the quotient of the relative atom ratio of F divided by the relative atom ratio of C.

F/C ratio=Relative atom ratio of F atom/Relative atom ratio of C atom (8) Residual Surface Cross-Linking Agent Content (in the Case of the Epoxy Compound)

In a beaker having an inner volume of 100 ml, 2.0 μg of a given water absorbent material was placed and 2 ml of a liquid composed of methanol/water at a mass ratio of 2/1 was added. The beaker containing them was stoppered and left standing for one hour. In the beaker, 5 ml of methanol was added and then filtered. The amount 1.0 g of the resultant filtrate was placed in a 50-ml eggplant-shaped flask and 0.05 ml of an aqueous 12 mass % nicotine amide solution was added thereto. The flask containing them was fitted with an air cooling tube and heated over a boiling water bath for 30 minutes. The resultant reaction solution was filtered with a filter paper. The filtrate was analyzed by high-performance liquid chromatography. Meanwhile, the same procedure was repeated while no water absorbent material was used and a known amount of a cross-linking agent was added. By using the consequently obtained calibration curve as an external standard and taking into consideration the ratio of dilution of the filtrate, the residual surface cross-linked agent content in the water absorbent material (ppm) was calculated.

(9) Absorption Velocity (Vortex)

A mixture resulting from adding 0.02 mass part of certified food grade blue color No. 1 (CAS No.: 3844-45-9), a food additive, to 1,000 mass parts of an aqueous 0.90 mass % sodium chloride solution (physiological saline water) prepared in advance was adjusted to a liquid temperature of 30° C. The volume 50 ml of the physiological saline water was separated into a beaker measuring 55 mm in barrel diameter and 70 mm in height and having an inner volume of 100 ml (such as, for example, a beaker conforming to JIS R-3503 and sold by Sogo Rikagaku Glass Manufactory), kept stirred with a cylindrical magnet type stirrer measuring 40 mm in length and 8 mm in diameter and made of Teflon (registered trademark) at 600 rpm, and 2.0 g of a given water absorbent resin obtained in a working example or a control to be described herein below was introduced therein, to determine the absorption velocity (second). With the starting-point and the ending point fixed in conformity with the standard described in JIS K 7224 (1996) "Method for testing highly water absorbent resin for absorption velocity with commentary," the time required for a given water absorbent resin to absorb physiological saline water till the stirrer tip is covered with a testing solution was measured to evaluate the absorption velocity (second).

Example 1

A reaction solution was produced by dissolving 2.8 g (0.025 mol %) of polyethylene glycol diacrylate (the average addition mol number of ethylene oxide: 8 mols) as an inner cross-linking agent in 5,500 g of an aqueous 37 mass % sodium acrylate solution having a neutralizing ratio of 75 mol %. Then, this reaction solution was deaerated in an atmosphere of nitrogen gas for 30 minutes. Subsequently, the reaction solution mentioned above was supplied to a jacketed stainless steel twin arm type kneader furnished with an openable lid and provided with two sigma type vanes. The interior of the kneader was displaced with nitrogen gas while the reaction solution in the kneader was kept at 30° C.

Subsequently, the reaction solution was kept stirred and 2.8 g of sodium persulfate and 0.12 g of L-ascorbic acid were added thereto. The reaction solution began polymerization within about one minute of the addition. Then, the polymerization was continued at 30° C.-95° C. of a peak temperature from starting. The reaction was terminated within 60 minutes of starting the polymerization and the hydrogel-like polymer consequently formed was taken out.

The hydrogel-like polymer thus obtained was finely divided to a diameter of about 5 mm. The finely divided hydrogel-like polymer was spread on a 50-mesh (aperture 300 μm) metal gauze and subjected to hot air drying at 150° C. for 90 minutes. Then, the dried polymer was ground with a shaking mill and further classified on a 30-mesh (aperture 500 μm) metal gauze to obtain an irregularly pulverized shaped water absorbent resin having a weight average particle diameter of 240 μm and containing particles measuring less than 106 μm in particle diameter at a ratio of 5 mass %. This water absorbent resin was found to have a coefficient of water absorption of 52 g/g.

One hundred (100) mass parts of the produced water absorbent resin and a surface cross-linking agent solution comprising 0.3 mass part of polypropylene glycol (SP value: δ=12.6 (cal/cm$^3$)$^{1/2}$ (2.58×10$^4$ (J/m$^3$)$^{1/2}$) as a first cross-linking agent and 0.1 mass part of ethylene glycol diglycidyl ether (SP value: δ=10.2 (cal/cm$^3$)$^{1/2}$ (2.09×10$^4$ (J/m$^3$)$^{1/2}$) as a second cross-linking agent were mixed. A surface cross-linked water absorbent resin was obtained by subjecting the resultant mixture to a heating treatment performed at 195° C. for 40 minutes. The weight average particle diameter of the produced surface cross-linked water absorbent resin was 249 μm and the proportion of particles less than 106 μm in particle diameter was 1 mass %.

This surface cross-linked water absorbent resin was tested for metal atom concentration (0 second value and 10 seconds value), F/C ratio, coefficient of water absorption, absorption velocity, ratio of moisture absorption, and residual surface cross-linking agent content. The results are shown in Table 1. This surface cross-linked water absorbent resin was manufactured into an absorbent article in accordance with the example of production of absorbent article and the method for evaluation of the performance of the absorbent article and the produced absorbent article was rated for performance. The results of working examples and comparative examples are given in Table 1.

Example 2

A water absorbent resin was manufactured by adding 0.3 g of finely divided hydrophilic silicon dioxide (made by Nippon Aerosil K.K. and sold under the trademark designation of "Aerosil 200") to 100 g of the surface cross-linked water absorbent resin obtained in Example 1 and mixing them together.

Example 3

One hundred (100) mass parts of the irregularly pulverized shaped water absorbent resin obtained in Example 1 and a surface cross-linking agent solution comprising 0.3 mass part of propylene glycol (SP value: $\delta=12.6$ $(cal/cm^3)^{1/2}$ $(2.58 \times 10^4$ $(J/m^3)^{1/2})$ as a first cross-linking agent and 0.1 mass part of ethylene glycol diglycidyl ether (SP value: $\delta$ $10.2$ $(cal/cm^3)^{1/2}$ $(2.09 \times 10^4$ as a second cross-linking agent and 0.3 mass part of water were mixed. The resultant mixture was subjected to a heating treatment performed at 195° C. for 40 minutes. The weight average particle diameter of the produced surface cross-linked water absorbable resin was 258 μm and the proportion of particles less than 106 μm in particle diameter was 1 mass %. The surface cross-linked water absorbent resin thus obtained was evaluated in the same manner as in Example 1.

Example 4

One hundred (100) mass parts of the irregularly pulverized shaped water absorbent resin obtained in Example 1 and a surface cross-linking agent solution consisting of 0.5 mass part of propylene glycol as a first cross-linking agent and 0.1 mass part of ethylene glycol diglycidyl ether as a second cross-linking agent and 1.5 mass parts of water were mixed. The resultant mixture was subjected to a heating treatment performed at 195° C. for 40 minutes. The surface cross-linked water absorbent resin thus obtained was evaluated in the same manner as in Example 1.

(Control 1)

One hundred (100) mass parts of the irregularly pulverized shaped water absorbing resin obtained in Example 1 and a surface cross-linking agent solution comprising of 0.8 mass part of propylene glycol as a first cross-linking agent, 0.02 mass part of ethylene glycol diglycidyl ether as a second cross-lining agent, 3 mass parts of water, and 1 mass part of isopropyl alcohol were mixed. A surface cross-linked water a absorbing resin was obtained by subjecting the resultant mixture to a heating treatment performed at 195° C. for 30 minutes. This surface cross-linked water absorbent resin was evaluated in the same manner as in Example 1.

Irregularly Pulverized Shaped Water Absorbent Resin (Control 2)

One hundred (100) mass parts of the irregularly pulverized shaped water absorbent resin obtained in Example 1 and a surface cross-linking agent solution comprising of 0.3 mass part of 1,4-butane diol (SP value: $\delta$ $12.1$ $(cal/cm^3)^{1/2}$ $(2.47 \times 10^4$ $(J/m^3)^{1/2})$, 0.5 mass part of propylene glycol, and 2 mass parts of water were mixed. A water absorbent resin for comparison was obtained by subjecting the resultant mixture to a heating treatment performed at 195° C. for 40 minutes. This surface cross-linked water absorbent resin was evaluated in the same manner as in Example 1.

(Control 3)

The hydrogel-like polymer obtained in Example 1 was spread on a metal gauze having an aperture of 500 μm and subjected to a heating treatment performed at 150° C. for 90 minutes. The dried polymer was ground with a shaking mill and further classified with a 18.5-mesh (aperture 850 μm) metal gauze to afford an irregularly pulverized shaped water absorbable resin having a weight average particle diameter of 480 μm and containing particles less than 106 μm in particle diameter at a ratio of 5 mass %.

One hundred (100) mass parts of the irregularly pulverized shaped water absorbent resin consequently obtained and a surface cross-linking agent solution comprising 0.1 mass part of ethylene glycol diglycidyl ether, 0.3 mass part of propylene glycol, and 5 mass parts of water were mixed. A water absorbent resin for comparison was obtained by subjecting the resultant mixture to a heating treatment performed at 210° C. for 30 minutes. This surface cross-linked water absorbent resin was evaluated in the same manner as in Example 1.

Example 5

A reaction solution was produced by dissolving 6.72 g (0.06 mol %) of polyethylene glycol diacrylate (average addition mol number of ethylene oxide: 8 mols) as an inner cross-linking agent in 5,500 g of an aqueous 37 mass % sodium acrylate solution having a neutralization ratio of 75 mol %. Then, this reaction solution was deaerated in an atmosphere of nitrogen gas for 30 minutes. Subsequently, the reaction solution mentioned above was supplied to a jacketed stainless steel twin arm type kneader furnished with an openable lid and provided with two sigma type vanes. The reaction solution in the kneader was kept at 30° C. and the interior of the kneader was displaced with nitrogen gas.

Subsequently, the reaction solution was kept stirred and 2.8 g of sodium persulfate and 0.12 g of L-ascorbic acid were added thereto. The reaction solution began polymerization within about one minute of the addition. Then, the polymerization was continued at 30° C.-95° C. The reaction was terminated within 60 minutes of starting the polymerization and the hydrogel-like polymer consequently formed was taken out.

The hydrogel-like polymer thus obtained had been finely divided to a diameter of about 5 mm. The finely divided hydrogel-like polymer was spread on a 50-mesh (aperture 300 μm) metal gauze and subjected to hot air drying at 150° C. for 90 minutes. Then, the dried polymer was ground with a shaking mill and further classified on a 30-mesh (aperture 500 μm) metal gauze to obtain an irregularly pulverized shaped water absorbent resin having a weight average particle diameter of 240 μm and containing particles measuring less than 106 μm in particle diameter at a ratio of 2 mass %. This water absorbent resin was found to have a coefficient of water absorption of 40 g/g.

One hundred (100) mass parts of the water absorbent resin consequently obtained and a surface cross-linking agent solution comprising 0.2 mass part of propylene glycol (SP value: $\delta=12.6$ $(cal/cm^3)^{1/2}(2.58 \times 10^4$ $(J/m^3)^{1/2})$ and 0.2 mass part of 1,4-butane diol (SP value: $\delta=12.1$ $(cal/cm^3)^{1/2}$ $(2.47 \times 10^4$ $(J/m^3)^{1/2})$ as first cross-linking agents and 0.1 mass part of ethylene glycol diglycidyl ether (SP value: $\delta=10.2$ $(cal/cm^3)^{1/2}$ $(2.09 \times 10^4$ $(J/m^3)^{1/2})$ as a second cross-linking agent were mixed. The resultant mixture was subjected to a heating treatment performed at 210° C. for 30 minutes to afford a surface treated water absorbent resin. This surface cross-linked water absorbent resin was evaluated in the same manner as in Example 1.

Example 6

One hundred (100) mass parts of the irregularly pulverized shaped water absorbent resin obtained in Example 5 and a surface cross-linking agent solution comprising 0.2 mass part of propylene glycol (SP value: $\delta=12.6$ $(cal/cm^3)^{1/2}$ $(2.58\times10^4$ $(J/m^3)^{1/2})$ and 0.2 mass part of 1,4-butane diol glycol (SP value: $\delta=12.1$ $(cal/cm^3)^{1/2}$ $(2.47\times10^4$ $(J/m^3)^{1/2})$ as first cross-linking agents, 0.1 mass part of ethylene glycol diglycidyl ether glycol (SP value: $\delta=10.2$ $(cal/cm^3)^{1/2}$ $(2.09\times10^4$ $(J/m^3)^{1/2})$, and 0.3 mass part of water were mixed. A surface treated water absorbent resin was obtained by subjecting the resultant mixture to a heating treatment performed at 210° C. for 30 minutes. This surface cross-linked water absorbent resin was evaluated in the same manner as in Example 1.

Example 7

A water absorbent resin was manufactured by mixing a solution of a surface cross-linking agent containing 0.1 mass part of propylene glycol as the first cross-linking agent and 0.02 mass part of ethylene glycol glycidyl ether as the second cross-linking agent to 100 mass parts of an irregularly pulverized shaped absorbent resin obtained in Example 1. The resultant mixture was subjected to a heating treatment performed at 195° C. for 40 minutes. The surface cross-linked water absorbent resin thus obtained was evaluated in the same manner as in Example 1.

(Control 4)

1.0 mass part of ground paraffin (melting point: 60-62° C., product of Wako Junyaku Kogyo Kabushiki Kaisha) was mixed with the irregularly pulverized shaped absorbent resin obtained in Example 1. The resultant mixture was subjected to a heating treatment performed at 80° C. for 10 minutes. The surface cross-linked water absorbent resin thus obtained was evaluated in the same manner of Example 1.

TABLE 1

| | | Example 1 | Example 2 | Example 3 | Example 4 | Example 5 | Example 6 |
|---|---|---|---|---|---|---|---|
| Water absorbent resin particles | | | | | | | |
| Metal atom concentration (Na concentration) | 0 second value | 0 | 0 | 0 | 2 | 0 | 0 |
| | 10 seconds value | 22.0 | 22.0 | 18.4 | 26.1 | 21.8 | 18.9 |
| Y = aX + b | | 0.50x + 10.7 | 0.50x + 10.7 | 0.43x + 7.4 | 0.47x + 12.2 | 0.51x + 8.8 | 0.44x + 7.3 |
| F/C ratio | | 0 | 0 | 0 | 0 | 0 | 0 |
| Weight average particle diameter (μm) | | 249 | 248 | 258 | 264 | 267 | 263 |
| Logarithmic standard deviation δζ | | 0.35 | 0.37 | 0.36 | 0.38 | 0.35 | 0.35 |
| Particle size distribution (%) | | | | | | | |
| 425 μm ON | | 1 | 0 | 1 | 1 | 1 | 1 |
| 355-425 μm | | 11 | 13 | 13 | 15 | 17 | 16 |
| 300-355 μm | | 21 | 19 | 22 | 23 | 21 | 20 |
| 150-300 μm | | 57 | 57 | 55 | 50 | 53 | 55 |
| 106-150 μm | | 9 | 9 | 9 | 11 | 7 | 7 |
| 75-106 μm | | 1 | 2 | 1 | 0.5 | 1 | 1 |
| 75 μm through | | 0 | 0 | 0 | 0 | 0 | 0 |
| Residual surface cross-linking agent (ppm) | | N.D. | N.D. | N.D. | 3 | N.D. | N.D. |
| Coefficient of water absorption (g/g) | | 49 | 48 | 48 | 43 | 37 | 36 |
| Absorption velocity (sec) | | 24 | 24 | 23 | 18 | 21 | 22 |
| Ratio of blood absorption (%) | | 90 | 92 | 86 | 80 | 92 | 87 |
| Ratio of moisture absorption (%) | | 1.4 | 1.7 | 1.8 | 1.7 | 1.3 | 1.5 |
| Absorbent article | | | | | | | |
| Liquid passing time (sec) | | | | | | | |
| First cycle | | 10 | 10 | 10 | 10 | 12 | 13 |
| Second cycle | | 28 | 26 | 24 | 19 | 28 | 24 |
| Third cycle | | 44 | 37 | 38 | 40 | 40 | 40 |
| Fourth cycle | | 50 | 51 | 47 | 45 | 49 | 48 |
| Total amount of absorption (g) | | 1100 | 1100 | 1080 | 1150 | 900 | 880 |

| | | Control 1 | Control 2 | Control 3 | Example 7 | Control 4 |
|---|---|---|---|---|---|---|
| Water absorbent resin particles | | | | | | |
| Metal atom concentration (Na concentration) | 0 second value | 6.3 | 17.4 | 17.2 | 3.2 | 0 |
| | 10 seconds value | 43.5 | 35.9 | 40.6 | 31.9 | 0.7 |
| Y = aX + b | | 0.37x + 23.0 | 0.26x + 27.4 | 0.24x + 27.7 | 0.38x − 15.4 | 0.15x − 0.2 |
| F/C ratio | | 0 | 0.04 | 0.08 | 0 | 0 |
| Weight average particle diameter (μm) | | 265 | 321 | 555 | 243 | 237 |
| Logarithmic standard deviation δζ | | 0.35 | 0.50 | 0.29 | 0.40 | 0.45 |
| Particle size distribution (%) | | | | | | |
| 425 μm ON | | 1 | 2 | 77.1 | 0 | 1 |
| 355-425 μm | | 17 | 25 | 9.9 | 14 | 15 |
| 300-355 μm | | 20 | 39 | 4.7 | 18 | 16 |
| 150-300 μm | | 54 | 15 | 8.2 | 55 | 52 |

TABLE 1-continued

| | | | | | |
|---|---|---|---|---|---|
| 106-150 μm | 7 | 10 | 0.1 | 11 | 13 |
| 75-106 μm | 1 | 8 | 0 | 3 | 3 |
| 75 μm through | 0 | 1 | 0 | 1 | 1 |
| Residual surface cross-linking agent (ppm) | N.D. | — | 6 | 0 | — |
| Coefficient of water absorption (g/g) | 34 | 28 | 32 | 48 | 51 |
| Absorption velocity (sec) | 31 | 41 | 70 | 21 | 33 |
| Ratio of blood absorption (%) | 45 | 45 | 40 | 80 | 40 |
| Ratio of moisture absorption (%) | 3.2 | 3.0 | 5.0 | 1 | 0.5 |
| Absorbent article | | | | | |
| Liquid passing time (sec) | | | | | |
| First cycle | 13 | 11 | 10 | 12 | 10 |
| Second cycle | 35 | 18 | 15 | 28 | 35 |
| Third cycle | 48 | 35 | 26 | 35 | 45 |
| Fourth cycle | 50 | 51 | 33 | 51 | 55 |
| Total amount of absorption (g) | 753 | 620 | 670 | 1100 | 1000 |

Example 8

Water absorbent resins were obtained by following the procedure of Example 3 while changing the amount of water added during the course of surface cross-linkage based on 100 mass parts of a water absorbent resin to the amounts shown in Table 2. The individual water absorbent resins were tested for F/C ratio, metal atom concentration (Na concentration), and mixing property. The evaluation of the mixing property used a sample produced by mixing the surface cross-linking agent solution and the water absorbent resin in equal amounts. The rating was made on a three-point scale, wherein ○ denotes a good mixing property, Δ denotes partial occurrence of aggregate, and x denotes formation of aggregate or integration. The results are shown additionally in Table 2.

TABLE 2

| Amount of water incorporated (mass part) | | 0 | 0.3 | 1.5 | 3 | 5 |
|---|---|---|---|---|---|---|
| F/C ratio | | 0 | 0 | 0 | 0 | 0.2 |
| Metal atom concentration (Na concentration) | 0 second value | 0 | 0 | 2 | 12 | 18 |
| | 10 seconds value | 22 | 18.4 | 26 | 35 | 44 |
| Mixing property | | ○ | ○ | ○ | Δ | X |

INDUSTRIAL APPLICABILITY

This invention provides a water absorbent material excelling in absorption properties. The water absorbent material is useful as such absorbent materials as disposable diapers.

The invention claimed is:

1. A water absorbent material comprising a surface cross-linked water absorbent resin resulting from granular irregularly pulverized shaped particles of partial neutralization or whole neutralization of a water absorbent resin having acrylic acid or a metal salt thereof as a main component, which water absorbent material shows a metal atom concentration on the surface of said water absorbent material in the range of 0-10 atom % at 0 second value of polishing and in the range of 2 to below 35 atom % at 10 seconds of polishing as determined by subjecting said water absorbent material to Ar ion discharge polishing under a voltage of 500 V,
  wherein the water absorbent resin having acrylic acid or a metal salt thereof as a main component has a ratio of partial neutralization in the range of 50-90 mol %, and wherein a fluorine atom ratio to the number of carbon atoms, F/C ratio, in the surface of said water absorbent material on which —COOH has been converted to —COOCH$_2$—CF$_3$, is not more than 0.03,
  wherein the surface of the water absorbent resin is cross-linked in the presence of 0-0.3 mass part of water, based on 100 mass parts of the water absorbent resin,
  wherein the proportion of the water absorbent material having a particle diameter of less than 106 μm is in the range of 0-10 mass %,
  wherein the magnitude of the logarithmic standard deviation δζ which indicates the dispersibility of particle diameter is in the range of 0.25-0.45.

2. A water absorbent material according to claim 1, which possesses a relation shown by the following formula between said metal atom concentration Y on the surface polished by the method of Ar ion discharge polishing under a voltage of 500 V and a polishing time X measured at 0 second, 10 seconds, 40 seconds, and 70 seconds respectively of said polishing:

$Y=aX+b$, satisfying $0.30 \leq a \leq 0.60$ and $0<b<20$.

3. A water absorbent material according to claim 1, wherein said value at 10 second value is not more than 30 atom %.

4. A water absorbent material according to claim 1, wherein the relationship between the metal atom concentration Y and the polishing time X in seconds is as follows:

$Y=aX+b$, satisfying $0.30 \leq a$ and $0<b<15$.

5. A water absorbent material according to claim 1, wherein the residual epoxy compound content of said water absorbent material is not more than 5 ppm.

6. A water absorbent material according to claim 1, wherein the coefficient of absorption of physiological saline water is not less than 35 g/g and the coefficient of blood absorption is in the range of 70 to 100%.

7. A water absorbent material according to claim 1 wherein the speed to the physiological saline is not more than 30 seconds.

8. An absorbent article containing a water absorbent material set forth in claim 1.

9. A water absorbent material according to claim 1, wherein the surface of the water absorbent resin is cross-linked with a first cross-linking agent and a second cross-linking agent by contact with a surface cross-linking agent solution comprising the first cross-linking agent, the second cross-linking agent and 0-0.3 mass parts of water, based on 100 mass parts of the solid component of the resin,
  wherein the first cross-linking agent is polypropylene glycol and the second cross-linking agent is ethylene glycol diglycidyl ether.

10. A water absorbent material according to claim 1, wherein the water absorbent material consists of the surface cross-linked water absorbent resin.

11. The water absorbent material according to claim 1, wherein the F/C ratio is 0 to 0.01.

12. The water absorbent material according to claim 1, wherein the weight average particle diameter of the water absorbent resin is in the range of 200-300 μm.

* * * * *